United States Patent [19]

Kawai et al.

[11] Patent Number: 4,819,083
[45] Date of Patent: Apr. 4, 1989

[54] MOVING TYPE IMAGE RECORDING APPARATUS

[75] Inventors: Masanori Kawai; Kiyotaka Murakami; Tatsuji Kurogama; Mitsuru Watanabe, all of Hino, Japan

[73] Assignee: Konishiroku Photo Industry Co., Ltd., Tokyo, Japan

[21] Appl. No.: 7,796

[22] Filed: Jan. 28, 1987

[30] Foreign Application Priority Data

| Jan. 31, 1986 [JP] | Japan | 61-19655 |
| Jan. 31, 1986 [JP] | Japan | 61-19657 |
| Feb. 18, 1986 [JP] | Japan | 61-34834 |
| Apr. 3, 1986 [JP] | Japan | 61-77289 |
| Jun. 26, 1986 [JP] | Japan | 61-149991 |

[51] Int. Cl.$^4$ .............................................. H04N 1/024
[52] U.S. Cl. ..................... 358/294; 358/296; 346/76 PH; 382/59
[58] Field of Search ............. 358/294, 286, 296; 382/59; 346/76 PH

[56] References Cited

U.S. PATENT DOCUMENTS

| 4,523,235 | 6/1985 | Rajchman | 358/286 |
| 4,574,317 | 3/1986 | Scheible | 358/286 |
| 4,701,804 | 10/1987 | Toyoda et al. | 382/59 |

Primary Examiner—Edward L. Coles, Sr.
Attorney, Agent, or Firm—Jordan B. Bierman

[57] ABSTRACT

A moving type image recording apparatus wherein an image on an original document is recorded on a substance to be recorded by moving an apparatus body having a recording device, the recording device being driven based on an information from a detecting device for detecting a moving amount of the apparatus body. A device for reading the image on the original document, a memory device for storing an image information from the reading device, and an edit device for the information stored by the memory device are provided.

16 Claims, 23 Drawing Sheets

FIG. 5
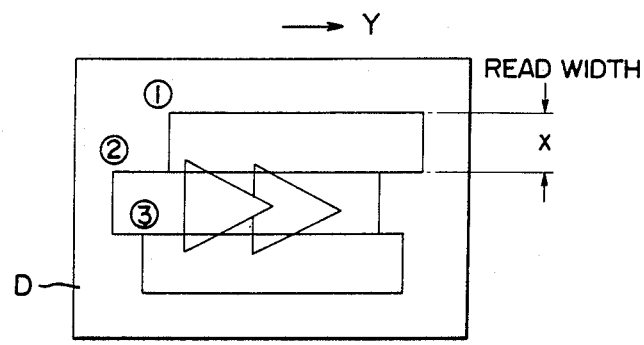
FIG. 6(a) [RAM IMAGE]
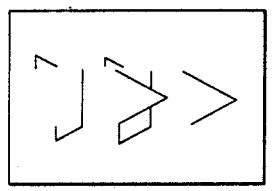 FIRST LINE
FIG. 7(a) [PRINTED IMAGE]
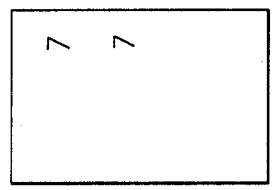 FIRST LINE
FIG. 6(b)
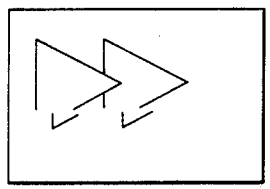 FIRST LINE + SECOND LINE
FIG. 7(b)
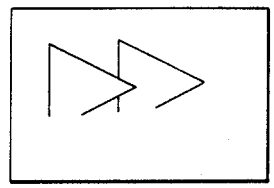 FIRST LINE + SECOND LINE
FIG. 6(c)
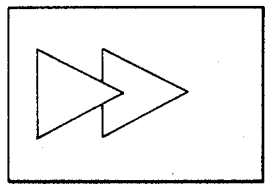 FIRST LINE + SECOND LINE + THIRD LINE
FIG. 7(c)
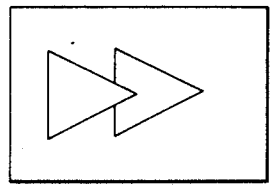 FIRST LINE + SECOND LINE + THIRD LINE
FIG. 8(a)
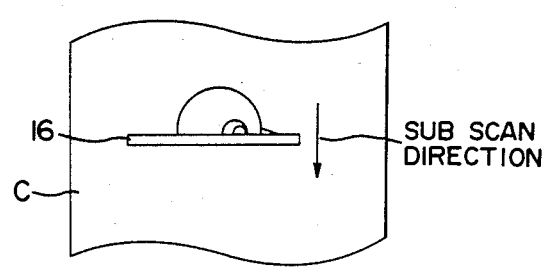
FIG. 8(b)
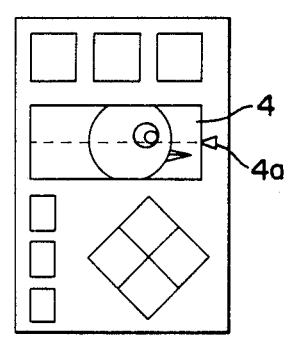

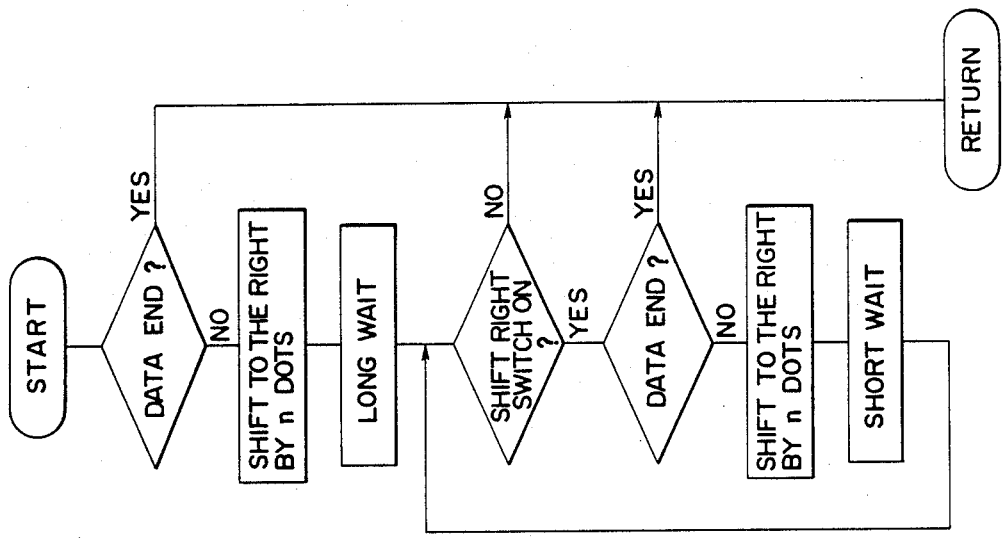
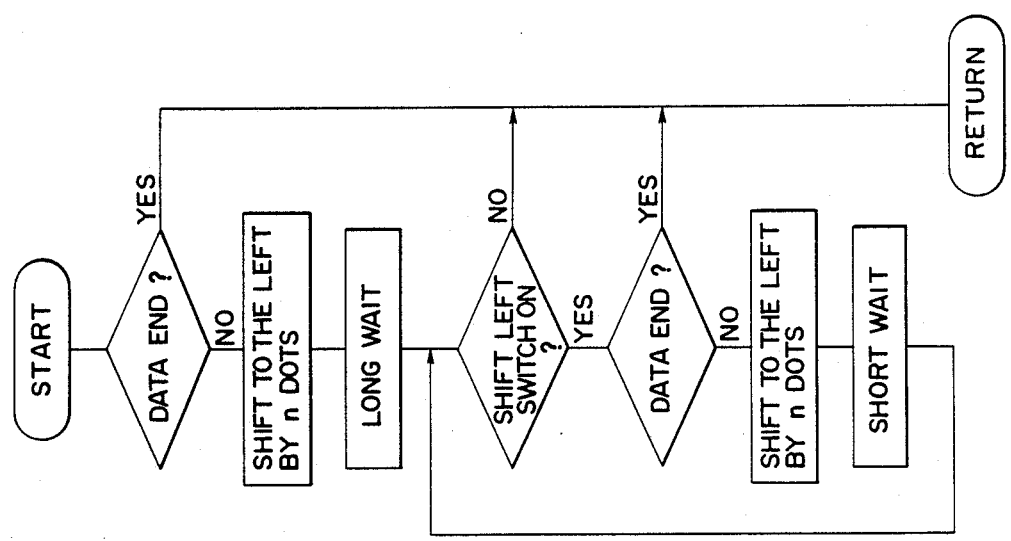

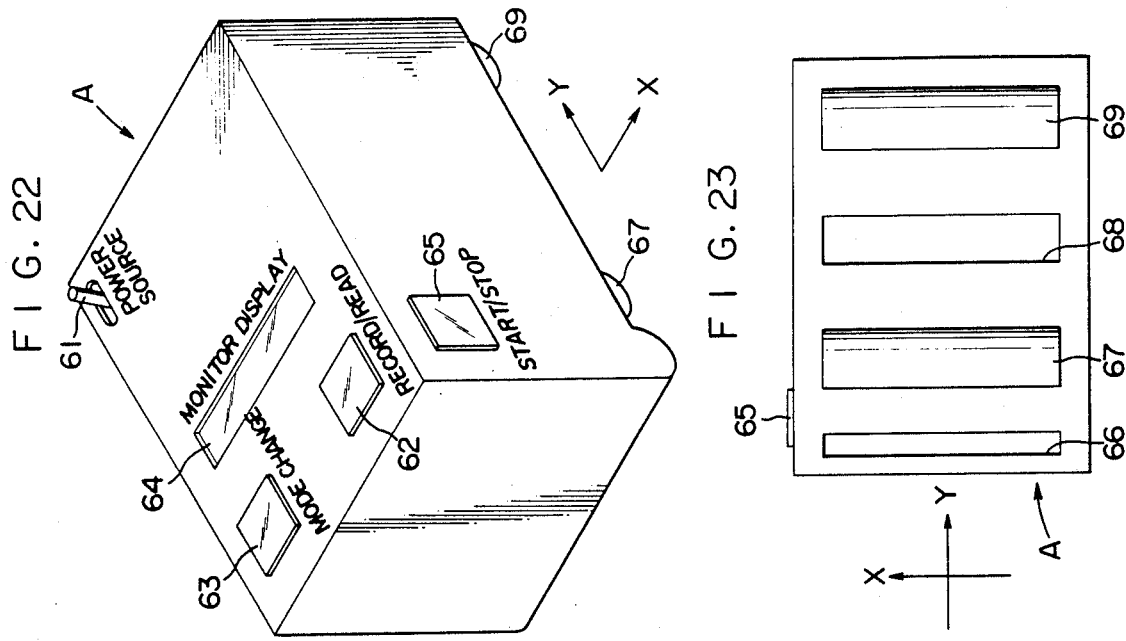
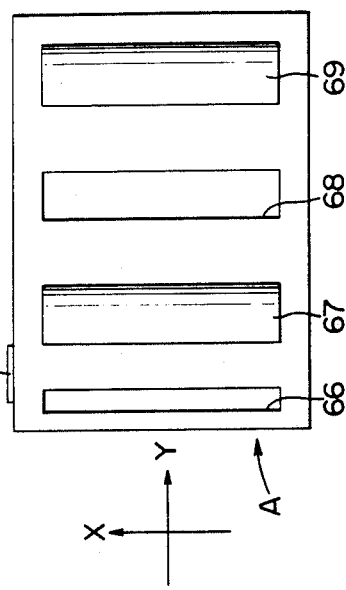
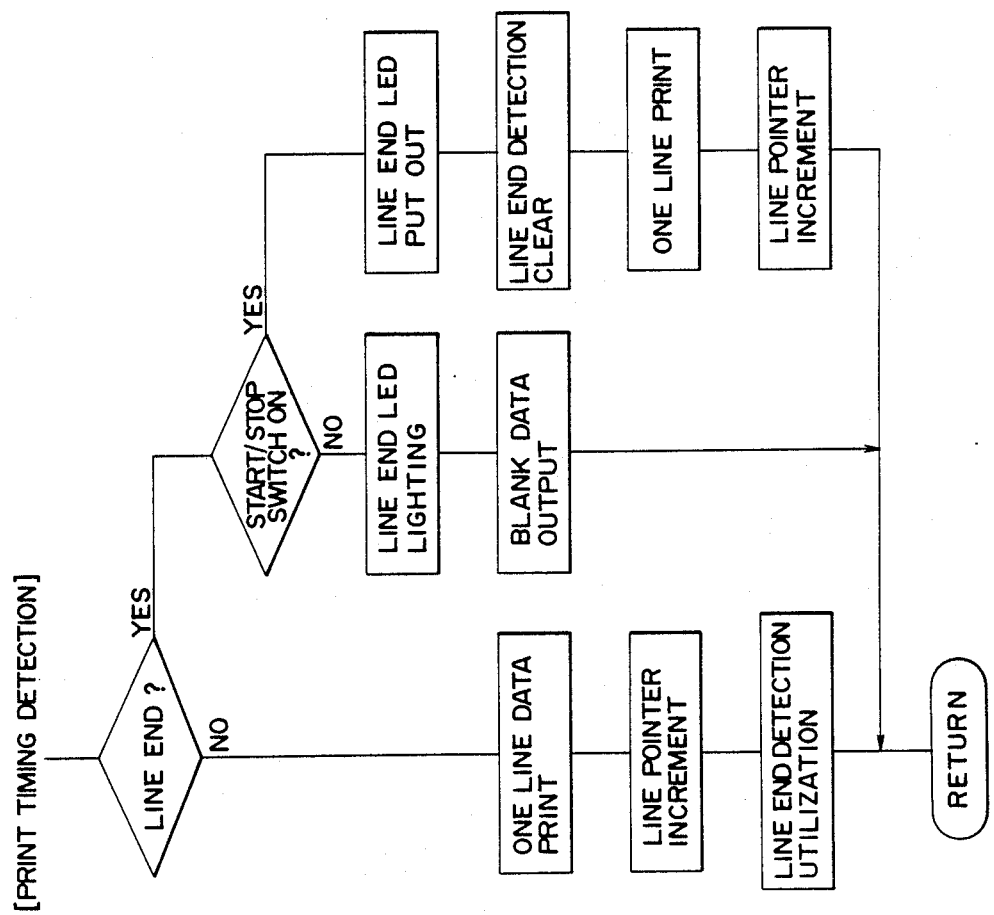

F I G. 33(a)
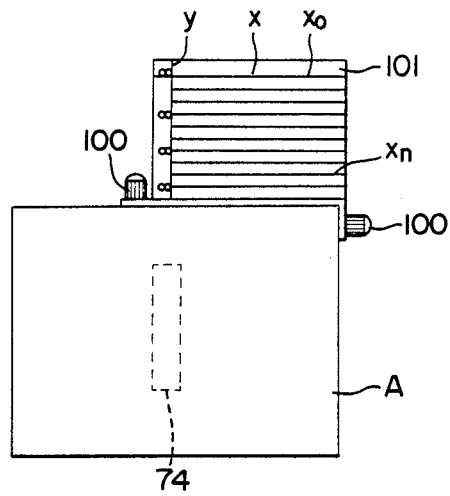
F I G. 33(b)
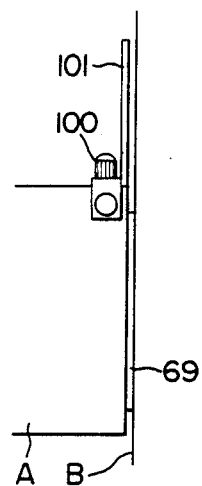
F I G. 34(a)
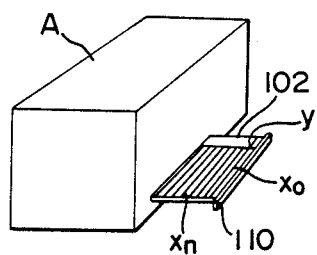
F I G. 34(b)
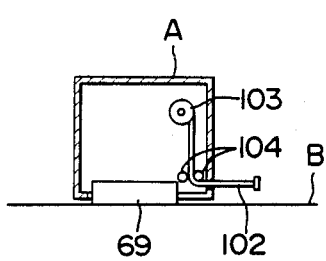
F I G. 35
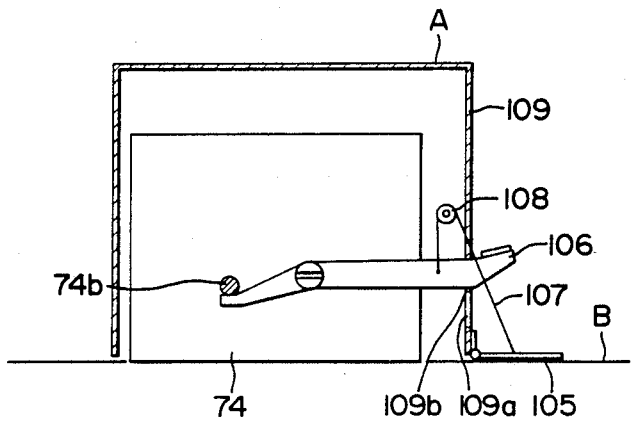

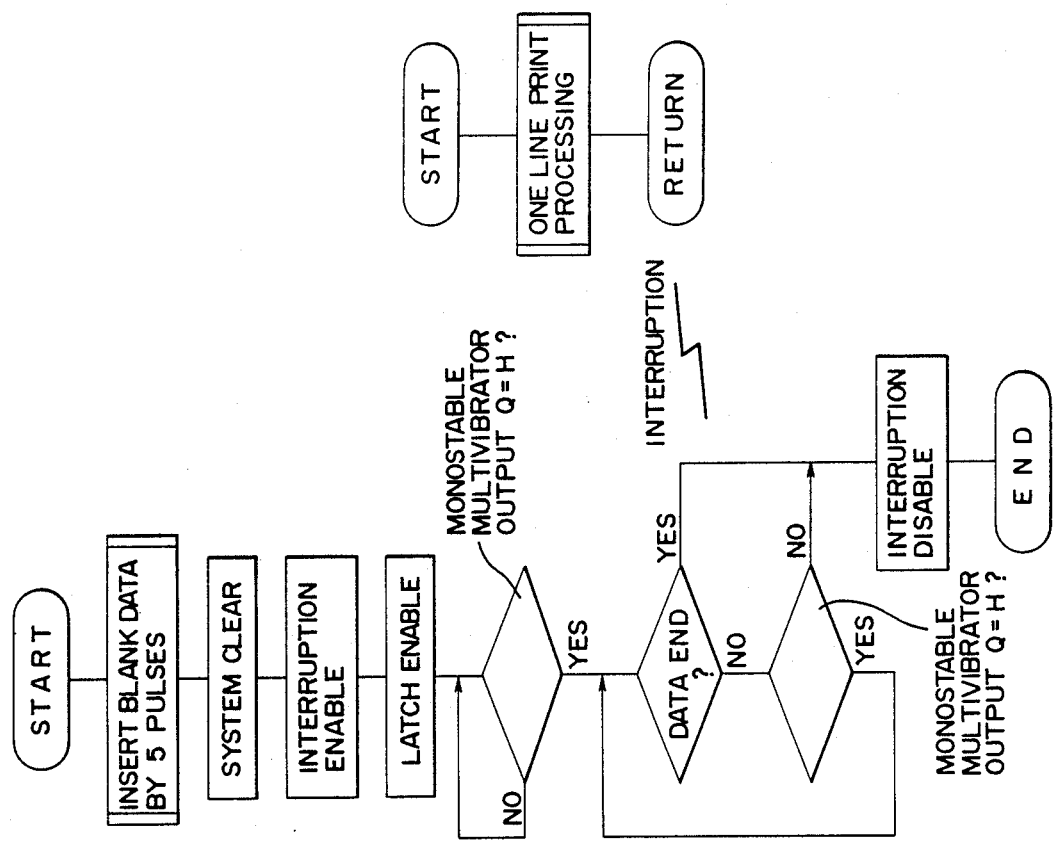
FIG. 43
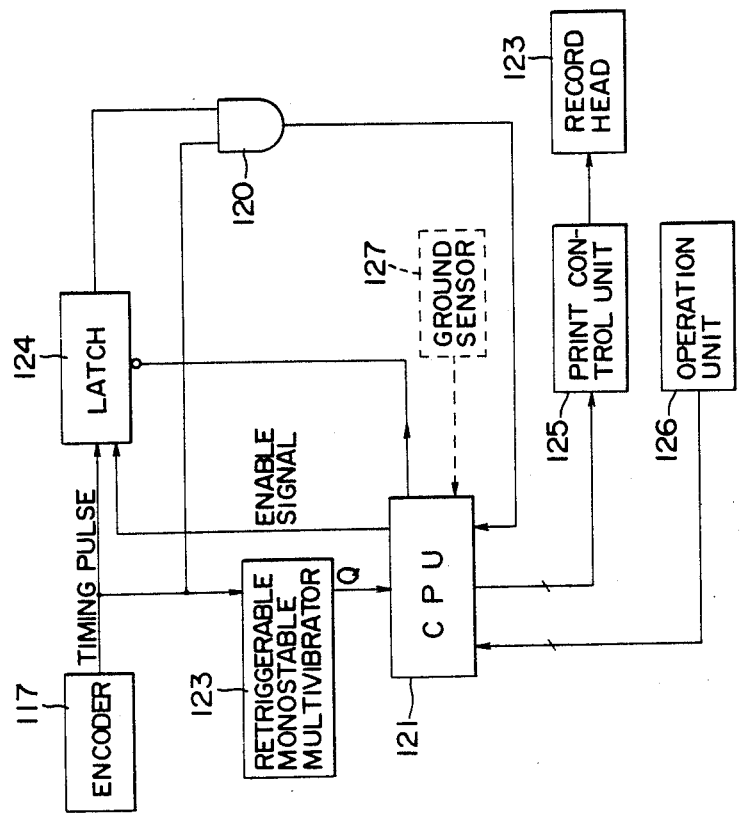
FIG. 41
FIG. 42

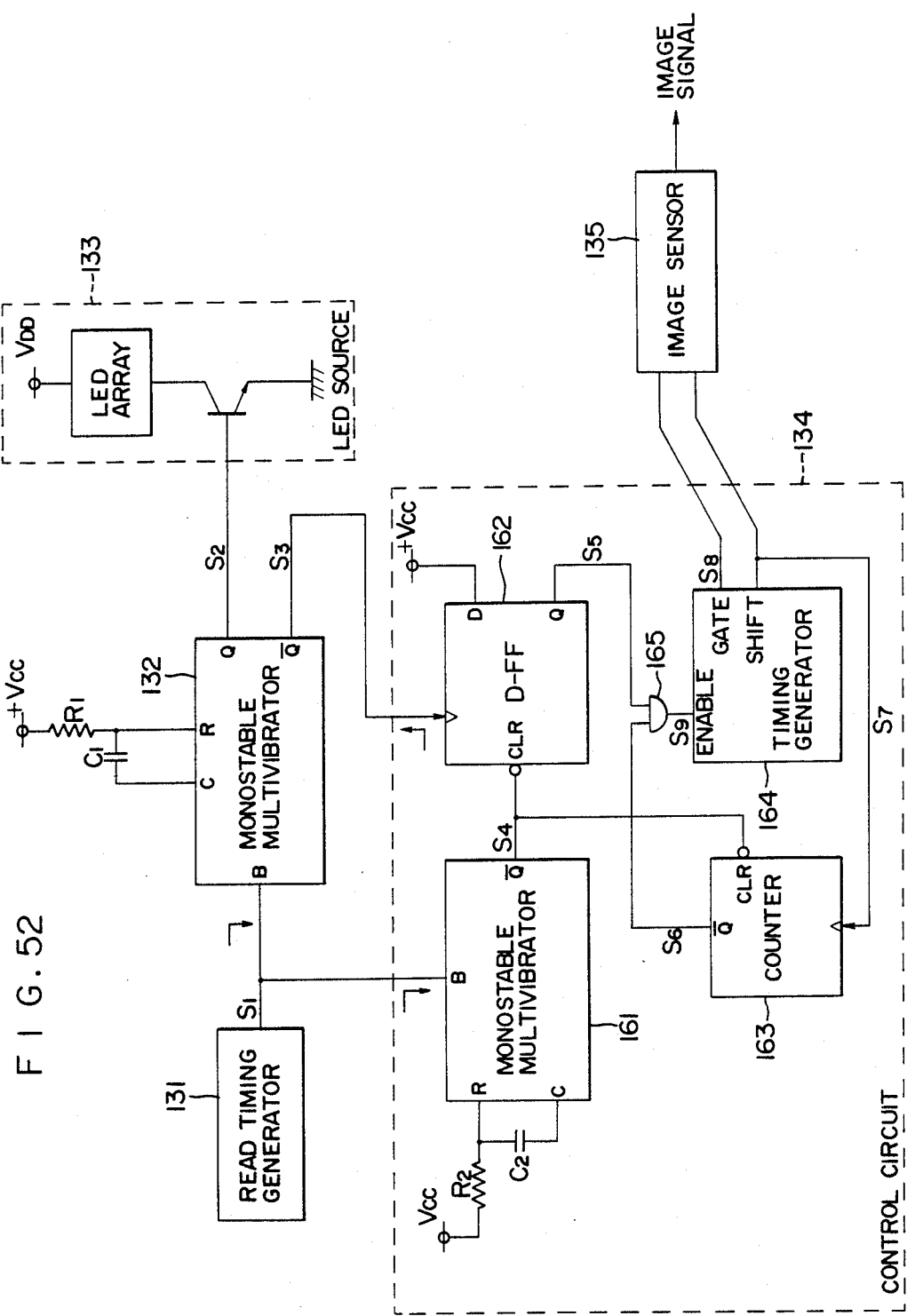
F I G. 52

FIG. 53
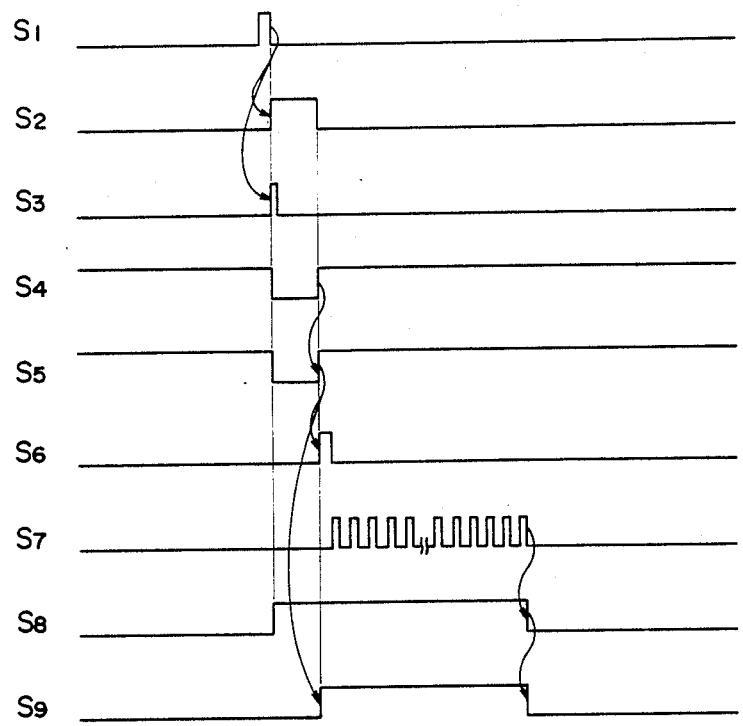
FIG. 54
PRIOR ART
(a) LED
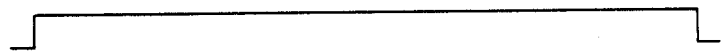
(b) READ TIMING
(c) IMAGE SENSOR SCAN
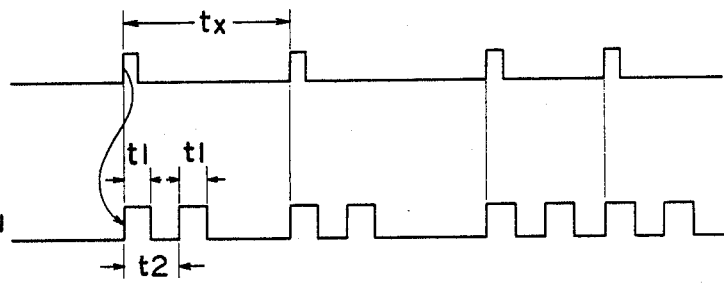

MOVING TYPE IMAGE RECORDING APPARATUS

BACKGROUND OF THE INVENTION

1. Field of the Invention

The present invention relates to a moving type copying apparatus where image is read or recorded during moving.

2. Description of the Prior Art

Such a moving type copying apparatus has not been proposed in the prior art. In a copying apparatus of the prior art, finder system is used in order to perform positioning during read action. However, since there is no means for confirming the content during record action, the content to be recorded must be forecasted or the positioning must be performed in trial and error. Consequently, if one image is formed by copying of several times, the complete positioning following the previous copying cannot be performed.

On the other hand, a scanner (reading apparatus) is proposed in Japanese patent application laid-open No. 33774/1981 and No. 151269/1984. In this case, an image sensor is used but a one-dimensional line sensor. Consequently, it can display the read data but cannot be utilized in the positioning to a paper during record action.

In any of the above-mentioned patent applications in the prior art, several lines including the line being read are displayed. The former uses a light emission element for display, and the latter uses a liquid crystal therefor.

Consequently, in the prior art, the reading apparatus displays information being read, but is not used in edit function. Also the apparatus in the prior art is not provided with edit function of image. Further, in a moving type reading apparatus in the prior art, edit function is not particularly provided.

In a moving type reading apparatus, if it is not clear what portion of stored image data should be written during record action, the apparatus is inconvenient in use. When image extending over several lines is outputted, it is quite difficult to align the printing top position. Further, unnecessary portion (e.g., blank) of the stored image data cannot be cut.

Japanese patent application laid-open No. 20476/1983 discloses an apparatus having means for positioning between the previous record and the present record. This is a printer having a drum-like type holder, and a positioning scale plate is installed on the printer in order to align the printing position.

In this system, however, since positioning is performed based on a ruled line printed on a paper, the printing position cannot be aligned if there is no ruled line.

FIG. 44 shows an image forming apparatus A of manual moving type, where subscanning is performed by moving the apparatus. In this case, travelling rollers 111, 112 are installed respectively at front and rear sides in the moving direction shown by arrow Y, and a record head 113 constituted by a thermal head is installed between the travelling rollers 111, 112 and supplied with spring force downward. A thermal transfer ribbon 114 is suspended to a record surface (plural printing elements being heater elements arranged in perpendicular direction to the paper surface) of the recording head 113, and fed in arrow a direction corresponding to the moving amount of the apparatus A. Numeral 115 designates an original wound portion of the ink ribbon 114, and numeral 116 designates a taking portion thereof Numeral 117 designates an encoder for detecting the rotation amount of one travelling roller 111, i.e., the moving amount of the apparatus A and generating the timing signal of the record. Numeral 118 designates a ribbon guide.

In the apparatus A, if the travelling rollers 111, 112 are held on a substance D to be recorded (ordinary paper) and moved in the arrow Y direction and subjected to the subscanning, the printing elements of the recording surface of the recording head 113 are selectively heated based on the image data signal every time the timing signal comes from the encoder 117 so that the thermal transfer ribbon 114 is transferred to the substance D to be recorded and prescribed image is formed on the substance D to be recorded.

In the apparatus A, however, at a moment that the apparatus A starts the moving, the ribbon 114 does not always begin to slide on the heater elements of the recording head 113.

That is, in the apparatus of thermal transfer type, friction may be applied to the original wound portion 115 by a brake mechanism 119 so as to prevent sag of the ribbon 114, and resistance is produced in rotation of the original wound portion 115 or slip of the ribbon in the ribbon guide 118, and further the ribbon in itself is pushed to the substance D to be recorded and therefore subjected to resistance.

Fixing portion of the head 113 or the ribbon feed guide 118 to the apparatus A has play although it is slight. Moreover, these will be deformed although quite slightly when strength is applied thereto, and the ribbon also will lengthen when tension is applied thereto.

Consequently, immediately after the moving of the apparatus A is started, the moving amount of the apparatus A may be absorbed in the above-mentioned resistance, play, lengthening or the like so that the ribbon 114 does not yet slide on the record head 113.

However, since this point is not considered in the prior art and when the apparatus A is moved the drive pulse is simultaneously applied to the printing element in synchronization with the timing pulse as shown in FIG. 45, the printing element continues to apply the heat energy to the same position of the ribbon before the ribbon begins to slide on the element surface. As a result, sticking is liable to occur on the heater element of the ribbon.

The sticking is phenomenon that base of the ribbon is melted by heating (being excessive) from the heater element of the record head, and the melted substance adheres to the heater element. As a result, the ribbon may not be fed.

Above-mentioned problem will occur also in an image forming apparatus of self moving type. In the apparatus of self moving type, after the moving start signal is supplied, the apparatus runs for itself and records the image, thereby the moving speed and the record are effected as previously programmed.

An optical information reading apparatus is apparatus where an original document is irradiated by an information reading light source, and reflected light from the original document is converted in photoelectric conversion by a light receiving element and then taken as information (e.g., character information). Such apparatus is exemplified by a copying machine or a facsimile. In recent years, an apparatus being handy to carry is developed where information of an original document is read by hand scan. In such optical information reading apparatus, the original document is irradiated and necessary exposure amount is secured thereby the clear original information can be obtained.

For example, in invention described in Japanese patent application laid-open No. 96954/1985, information reading light source (light emission element) is continuously lit, and charge storage time of an image sensor (e.g., CCD) to convert optical information into electric signal is controlled to become constant. That is, dummy read is performed once and a shift register is cleared, and then the constant charge storage time is secured and the information read action is performed again. In another exposure control method, a shutter to enable high-speed operation is put in front of an image sensor and the exposure amount is controlled depending on aperture area of the shutter.

FIG. 54 is a timing chart illustrating an example of an image sensor drive method according to the abovementioned method in the prior art. In FIG. 54, (a) shows LED lit state, (b) shows timing of original document information reading signal, and (c) shows scan state of the image sensor. If the LED is lit as shown in (a) and the write signal comes as shown in (b), scan of the image sensor (e g., CCD) is performed twice within the read period tx as shown in (c). The first scan is a dummy scan as above described.

If the scan time of the image sensor per once is made t1, time t1 is expressed by following formula.

$$t1 = N \times S$$

wherein
N: the picture element number of the image sensor
S: time required to shift the picture element number by one picture element After lapse of time t2 (t2>t1) from the drive start of the image sensor, the read action is started again. The information read requires time t1 in similar manner to the first scan. Consequently, time t1+t2 is necessary from coming of the read signal until finishing of the original document information reading.

In the above-mentioned apparatus, the LED as information reading light source is lit continuously as shown in FIG. 54. Consequently, in an apparatus of battery drive system such as an optical information reading apparatus of hand scan system, energy loss is produced and life of the battery is decreased. Also in the exposure amount control system using the shutter, the shutter mechanism is expensive and complicated and therefore this system is not suitable for practice.

SUMMARY OF THE INVENTION

In order to eliminate above-mentioned disadvantages in the prior art, an object of the invention is to provide a moving type copying apparatus wherein a display unit is of multiple functions.

In order to attain the above object, the invention is provided with a display unit having two or more functions among display function of displaying images in whole or partial region of a reading aperture part during reading or all images already read, display function of displaying content of a part or all of stored data during recording or edit content, and display function of displaying stored image including a record portion during recording or a record portion capable of being displayed in the display unit.

Another object of the invention is in that image data at any memory position can be called during recording and set to the printing top position and therefore the printing start position of each line can be aligned during feeding and/or that unnecessary portion such as blank at the top regarding the portion to be printed can be deleted and/or that enlarge/reduce of the stored image data is displayed thereby edit of data can be performed at high accuracy and/or that the line feed is urged after data record by one line thereby output position of the data record extending over several lines can be aligned.

In order to attain the above object the invention provides a moving type recording apparatus having at least one edit function among enlarge/reduce, roll up/down, image shift and line end processing.

Another object of the invention is to provide an image recording apparatus wherein a ruled line is not required, and positioning to the previously recorded portion can be simply performed for next record.

In order to attain the above object, the invention is provided with a detecting means for performing detection with respect to the reference position being prescribed position of the already recorded portion in the record medium, and the positioning of the record is performed by the detecting means.

Another object of the invention is to solve abovementioned problems and make the ribbon slide always on the print element surface of the record head at start of printing.

In order to attain the above object, the invention is provided with a record head for recording output image of the record head through a ribbon onto a substance to be recorded, and the record start timing to the substance to be recorded is made a time of moving by a prescribed distance after the moving start of the apparatus.

Another object of the invention is to provide an optical information reading apparatus which can perform the optimum exposure with little consumption power in simple constitution.

In order to attain the above object, an optical information reading apparatus of the invention wherein an original document is scanned by an information reading light source and reflected light from the original document is converted in photoelectric conversion by an image sensor and taken in as information, is characterized in that the ON/OFF timing of the information reading light source is controlled in synchronization with the read timing of the original document information.

Foregoing and other objects and features of the invention will be apparent from the following description together with the accompanying drawings.

BRIEF DESCRIPTION OF THE DRAWINGS

FIG. 5 is a diagram illustrating reading;
FIG. 6(a)~FIG. 6(c) are diagrams illustrating age on an image storage RAM in edit;
FIG. 7(a)~FIG. 7(c) are diagrams illustrating image edited and recorded;
FIG. 8(a), FIG. 8(b) are diagrams illustrating record.

FIG. 19 is a flow chart of left image shift;

FIG. 20 is a flow chart of right image shift;

FIG. 21 is a flow chart of line end processing;

FIG. 22 is a perspective view of a copying apparatus as another embodiment of the invention;

FIG. 23 is a bottom view of the apparatus in FIG. 22;

FIG. 33(a) is a plan view of a copying apparatus having a detecting means as still another embodiment;

FIG. 33(b) is a fragmentary front view of the apparatus;

FIG. 34(a) is a perspective view of a copying apparatus having a detecting means as a modification of the detecting means in the embodiment of FIG. 33;

FIG. 34(b) is a sectional view of the apparatus;

FIG. 35 is a sectional view of a copying apparatus having a detecting means as another modification of the detecting means in the embodiment of FIG. 33;

FIG. 41 is a block diagram in application to an image forming apparatus of manual moving type;

FIG. 42 is a timing chart of operation of the circuit in FIG. 41;

FIG. 43 is a flow chart of apparatus control in utilization of the circuit in FIG. 41;

FIG. 52 is an electric circuit diagram illustrating a concrete constitution diagram of the embodiment shown in FIG. 46;

FIG. 53 is a timing chart illustrating operation of each part; and

FIG. 54 is a timing chart illustrating operation of an apparatus in the prior art.

DESCRIPTION OF THE PREFERRED EMBODIMENTS

Figure 1:
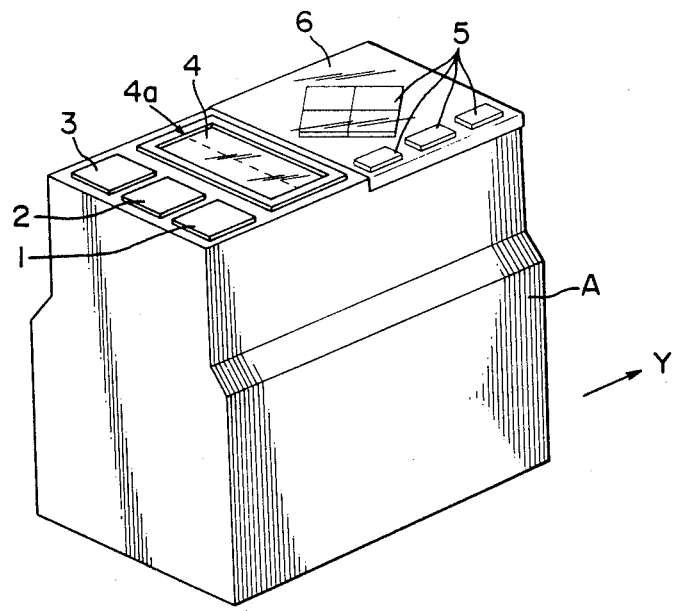
FIG. 1 is a perspective view of a copying apparatus as an embodiment of the invention.

Embodiments of the invention will now be described. FIG. 1 shows a moving type copying apparatus as an embodiment. In FIG. 1, numeral 1 designates a main switch for ON/OFF operation of a power source of the whole apparatus A. numeral 2 designates a mode change switch for selecting read mode, edit mode or record mode Numeral 3 designates a start/stop switch which turns the apparatus A on into operation ready enable state at the operation start in the selected read or record mode, and turns it off into operation disable state (stop). Numeral 4 designates a liquid crystal indicator having a marker 4a at the center in the longitudinal direction. The liquid crystal indicator 4 acts as a finder to display whole or partial image of the reading aperture at the read state, and acts to display the memory content or the edit content to be recorded at the record state, and further acts to display the stored image including record part during the recording and displayable record part. Moreover, the liquid crystal indicator 4 indicates state of the apparatus, for example, discrimination of record mode or read mode, degree of residual amount of the memory, or warning of voltage decrease of the battery Numeral 5 designates a key group for data editing, which is usually covered by a transparent cover 6 so that the key group is not pushed imprudently during other operation. Key operation of the key group 5 effects enlarge/reduce of data, roll up/down to shift up or down the image displayed on the indicator 4, image shift to shift right or left the image on the indicator 4, memory clear, and the like.

Figure 2:
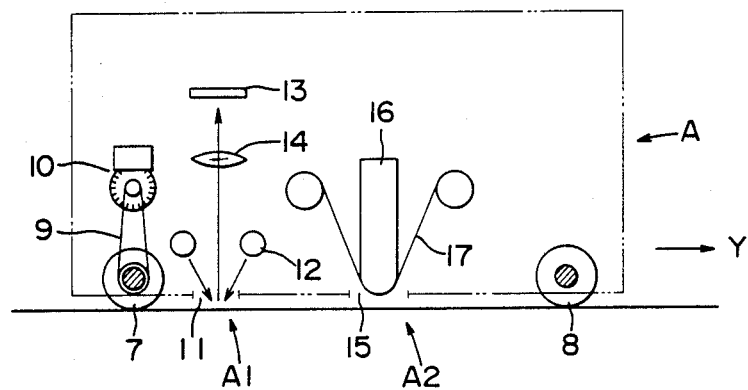
FIG. 2 is a diagram schematically illustrating an inner mechanism of the apparatus in FIG. 1.

FIG. 2 shows outline of a read mechanism section A1 and a record mechanism section A2 within the apparatus A. Moving of the apparatus A is guided by travelling rollers 7, 8 at front and rear sides, and an encoder 10 for detecting the moving direction and the moving amount (distance) is connected to one roller 7 through a belt 9. The read mechanism $A_1$ comprises a read window 11 as a read aperture, an illumination light source 12 for lighting a surface to be read through the read window 11, a two-dimensional image sensor 13 which receives reflection light from the surface to be read corresponding to the read window 11 and reads image of the light, and a lens 14 for focusing the image of the surface to be read onto the sensor 13. On the other hand, the record mechanism section $A_2$ comprises a record window 15 as a record aperture during recording, a thermal head 16 falling downward from the record window 15, and an ink ribbon 17 slidably contacting with a record surface of the head 16.

Figure 3:
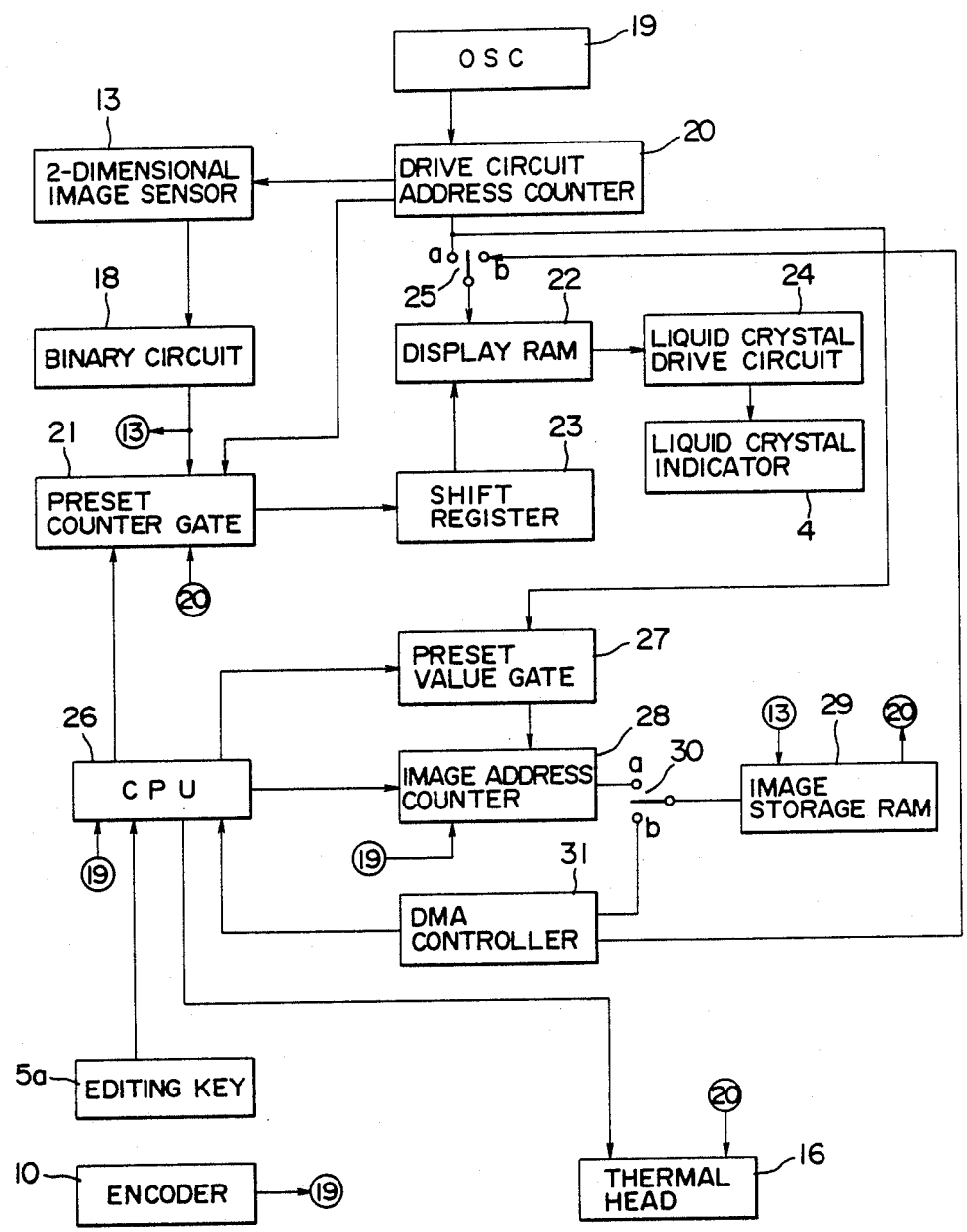
FIG. 3 is a block diagram of inside of the apparatus.

FIG. 3 shows function blocks within the apparatus A. Numeral 18 designates a binary circuit where data from the two-dimensional image sensor 13 is made binary condition, numeral 19 designates an oscillation circuit, and numeral 20 designates a drive circuit/address counter which drives the two-dimensional image sensor 13 in response to pulse from the oscillation circuit 19 and controls a preset counter/gate 21 and a display RAM 22. Numeral 23 designates a shift register to control the display RAM 22, and numeral 24 designates a liquid crystal drive circuit to drive the liquid crystal indicator 4, and numeral 25 designates a switch to be changed by the mode change, to a-side at the read mode and to b-side at the record/edit mode. Numeral 26 designates a CPU to control the whole apparatus, numeral 27 designates a preset value gate, numeral 28 designates an address counter for an image storage RAM 29, numeral 30 designates a switch similar to the switch 25, and numeral 31 designates a DMA controller.

Operation of the apparatus will be described. First, the power source switch 1 is turned on, and the mode change switch 2 selects the read mode. Thereby the illumination power source 12 is lit, and the read action is performed by the two-dimensional image sensor 13 and the indicator 4 displays the content.

That is, when the mode change switch 2 is operated into the read mode, the two-dimensional image sensor 13 is normally driven by the oscillator 19 and the drive circuit/address counter 20. Image signal from the two-dimensional image sensor 13 passes through the binary circuit 18 and is applied to the preset counter/gate 21. The preset counter/gate 21 performs compression of the image signal according to data supplied previously from the CPU 26, and transmits the obtained output to the display RAM 22 through the shift register 23. The content of the display RAM 22 is read by the display liquid crystal drive circuit 24 and displayed by the liquid crystal indicator 4.

Figure 4A:
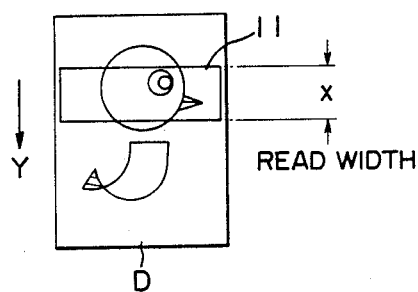
FIG. 4(a), FIG. 4(b) are diagrams illustrating reading.
Figure 4B:
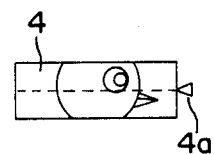

FIG. 4 shows state of the read display. The two-dimensional image sensor 13 reads portion of width x corresponding to the read window 11 in an original document D as shown in FIG. 4(a), and the portion of width x is displayed by the liquid crystal indicator 4 as shown in FIG. 4(b).

Next, the start/stop switch 3 is turned on, and the apparatus A is set to read enable state (start). The apparatus A is moved in arrow Y direction, and if the read timing signal coming from the encoder 10 is detected, data of one line in the image sensor 13 corresponding to position of the marker 4a in the indicator 4 is recognized by the preset value gate 27 and taken in the image memory RAM 29 by action of the image address counter 28. Subsequently the above-mentioned operation is repeated according to output of the encoder 10. After the definite running, the start/stop switch 3 is turned off into the read stop state. Next, similar operation is repeated along other line of the original document.

Before describing the edit mode, assume that, as shown in FIG. 5, one image (two Δ images) extends over three lines and respective read start points 1, 2, 3 are different. In this case, at the read end point, image on the image storage RAM 29 becomes as shown in FIG. 6(a). If output of one line is performed, image as shown in FIG. 7(a) is obtained. Regarding the second line, since the read start point is different from that of the first line, if the output (record) is performed in this state, slipped image will be produced. Consequently, using the edit function, image on the image storage RAM 29 is previously shifted before performing the output. In this example, the image may be shifted to the left.

The image shift will be described. In the edit mode, a part of image on the image storage RAM 29 is always transferred to the display RAM 22 by the DMA controller 31, and the liquid crystal indicator 4 displays the content of the display RAM 22. If the edit key 5a (image shift key in this case) in the key group 5 is pushed, the transfer control address of the DMA controller 31 is rewritten by the CPU 26 and portion on the image storage RAM 29 being different from that before pushing the key is transferred to the display RAM 22 and displayed. This operation is continued until the image comes to the desired position, and then the output is performed thereby the slipless image can be obtained. This state is shown in FIG. 6(b), FIG. 7(b). Image of the second line coincides with image of the first line in FIG. 6(b), and the image of the second line is recorded as shown in FIG. 7(b). Record start position of the second line is the same as that of the first line The above-mentioned operation is repeated, and finally, as shown in FIG. 6(c), the image of the image storage RAM 29 becomes coincident with the image to be read as shown in FIG. 5. That is, the image recorded over three lines becomes the slipless image as shown in FIG. 7(c) by scanning of three times.

Operation of the image record will be described. If the record mode is selected by the mode change switch 2, the transfer control address of the DMA controller 31 is determined by the CPU 26 so that the top of the stored image coincides with the write start position. Several lines including the write start position (for example, 1~640 dot rows, 320 dot columns) are displayed on the liquid crystal indicator 4.

Figure 9:
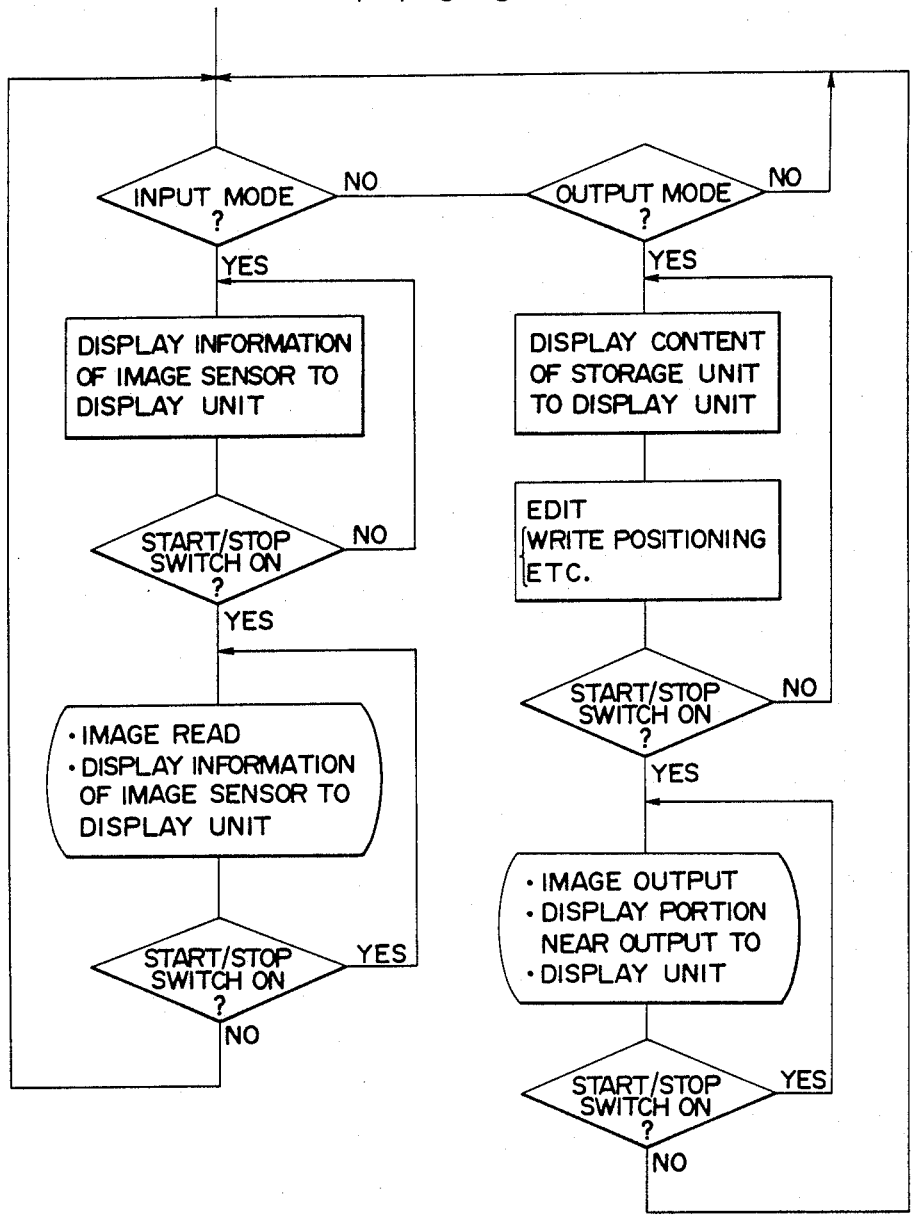
FIG. 9 is a flow chart of operation.

The display content is confirmed and positioning is performed so that the first column of data comes to the record position, and then the start/stop switch 3 is turned on. If the apparatus A is moved and the write timing signal from the encoder 10 is detected, data of one line corresponding to the marker 4a of the liquid crystal indicator 4 is transferred from the image storage RAM 29 to the thermal head 16 and recorded. At the same time, the transfer control address of the DMA 31 is rewritten and the display is scrolled, and the image to be recorded is shifted by one line in the reverse direction to the arrow Y direction. If the position relation of the scanning to the first scanning need not be considered, the above-mentioned scanning is continued. If it must be considered, the start/stop switch 3 is turned off, and content of the image storage RAM 29 for the second scanning is confirmed by the indicator 4. The edit key is operated as described in the above-mentioned edit mode and the top column of data for the second scanning is made coincident with the marker 4a, and then scanning is performed. The above-mentioned state is shown in FIG. 8(a), FIG. 8(b). Symbol C designates a recording paper. The edit mode and the record mode act interactive. FIG. 9 is a flow chart of the above-mentioned operation.

The indicator 4 can be provided with function of displaying images in whole or partial region of the read aperture during the read action or all images already read, function of displaying partial or whole content of the storage data during the record action or the edit content, and function of displaying stored images including record portion during the recording or record portion displayable on the indicator. However, only two functions among them will do.

According to the invention as above described, the read or record action can be simply performed by confirming the display unit. Particularly the positioning can be performed thereby the recording becomes quite easy.

Next, another embodiment of an apparatus of the invention having edit function will be described.

Figure 10:
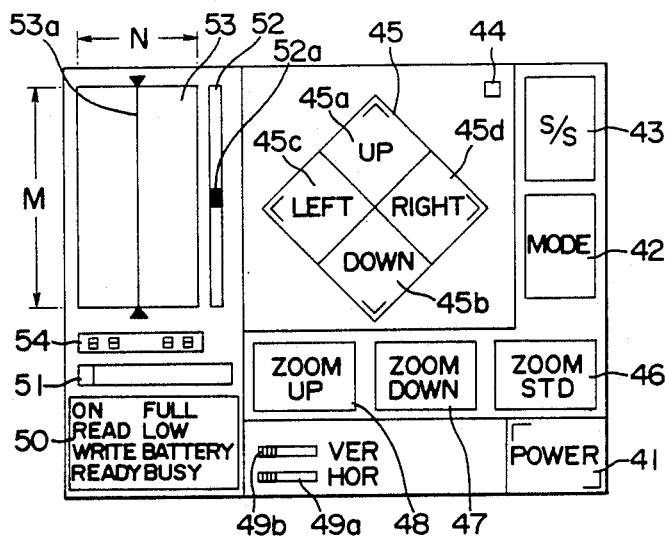
FIG. 10 is a plane view of an operation section of a moving type copying apparatus as another embodiment of the invention.

FIG. 10 is a view illustrating details of an operation section. Numeral 41 designates a power source switch, numeral 42 designates a mode switch for selecting mode (state of the apparatus), numeral 43 designates a start/stop switch, numeral 44 designates a line end display unit constituted by LED, numeral 45 designates an edit key for performing right shift, left shift, roll up, roll down or the like, numeral 46 a scale factor initialization switch, numeral 47 designates a zoom down (reduce) switch, numeral 48 designates a zoom up (enlarge) switch, numeral 49a designates a horizontal zoom ON/OFF switch, numeral 49b designates a vertical zoom ON/OFF switch, numeral 50 designates a status display unit constituted by LCD, numeral 51 designates a memory use amount display unit constituted by LCD for indicating data amount stored in the memory, numeral 52 designates a roll position display unit constituted by LCD, numeral 53 designates an image display panel constituted by LCD, and numeral 54 designates a zoom display panel (scale factor display panel) constituted by LCD for indicating scale factor of zoom in vertical and horizontal directions (the number of data dots per one display picture element).

The line end display unit 44 is lit when the start/stop switch 43 is pushed after one line is read in the input mode, and put out when the start/stop switch 43 is pushed again at the top position of next line. In the edit output mode, the line end display unit 44 is lit when the image attains to the line end. In the case of either input or output, indication is effected regarding that the apparatus in moving scanning attains to the line feed point.

The edit key 45 is used to read any portion of image data stored in a memory within the apparatus, and image data is shifted to upper side by pushing the key 45a, to lower side by pushing the key 45b, to the left by pushing the key 45c and to the right by pushing the key 45d. The accessed image data is displayed on the image display panel 53 in definite range.

The scale factor initialization switch 46, the zoom down switch 47, the zoom up switch 48, the horizontal zoom ON/OFF switch 49a and the vertical zoom ON/OFF switch 49b are switches for zoom control, and particularly the scale factor initialization switch 46 makes the scale factor coincident with the preset value The horizontal zoom ON/OFF switch 49a and the vertical zoom ON/OFF switch 49b are switches to make the zoom function effective or ineffective in the vertical and horizontal directions independently.

The status display unit 50 indicates status of the apparatus, and the display content is as follows. Such display content is erased when the power source is turned off.

ON ... indicated at the power source switch turned on
READ ... indicated at the input mode
WRITE ... indicated at the edit output mode
READY ... indicated at ready state of the apparatus
BUSY ... indicated at uusy state of the apparatus
FULL ... indicated at full state of data in the memory
LOW BATTERY ... indicated at voltage decrease state of the incorporated battery The roll position display unit 52 indicates that image displayed on the image display panel 53 is located to what position in the vertical length as a whole.

The image display panel 53 comprises a graphic display unit to display a part of the image data, and the center line 53a to indicate position of the record head is displayed at the center as already described.

Typical use procedure of the apparatus will be described, and subsequently the edit mode as the main point of the invention will be described in detail.

First, the power source switch 41 of the apparatus is turned on, and the mode switch 42 is pushed. Seeing the status display unit 50, "READ", i.e., the input mode is selected. Subsequently, the apparatus A is held on the original document and the start/stop switch 43 is depressed, and then the moving scanning is performed thereby the original document reading is started. When scanning of the original document extends over plural lines (plural times), the start/stop switch 43 is depressed at the end point of each line and depressed again at the top of next line thereby the scanning is repeated. When the all reading is finished, the mode switch 42 is pushed so that "WRITE" is displayed on the display unit 50.

Thus the output.edit mode is selected. In this state, after necessary edit work such as enlarge, reduce, shift or the like as hereinafter described is finished, if the start/stop switch 43 is pushed, output mode is set. By moving on the recording paper, printing is performed when the print timing comes during the scanning.

Figure 11:
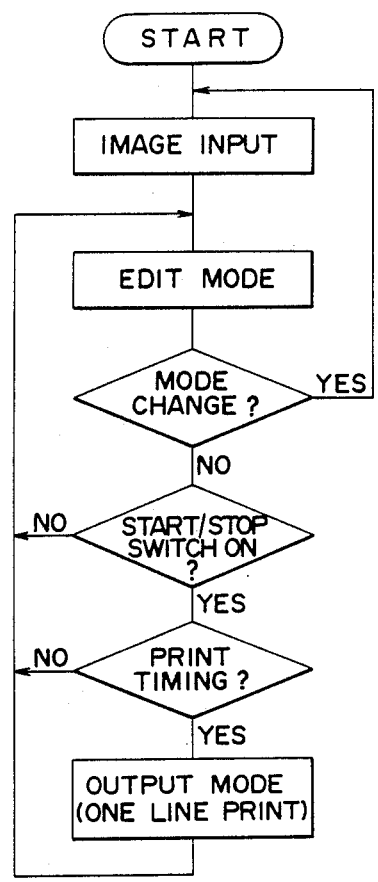
FIG. 11 is a flow chart of use procedure.

When the printing is not performed, edit mode is automatically set thereby the edit work can be performed. If the mode switch 42 is pushed in the edit mode, mode selection can be performed. In this case, input mode can be selected. Above-mentioned use procedure is shown in a flow chart of FIG. 11.

Figure 12:
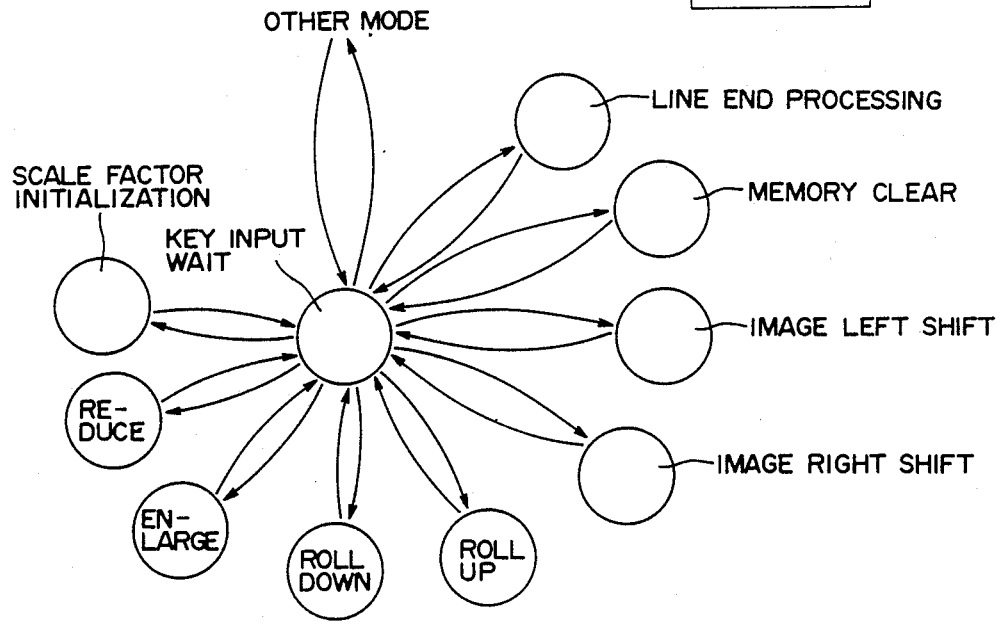
FIG. 12 is a transition diagram of edit mode state.

Next, the edit function will be described in detail. FIG. 12 is a state transition diagram of the edit mode. In this case, eight functions are supported. These functions will be described.

(1) zoom function (enlarge, reduce)

For example, if the zoom up switch 48 is depressed, the horizontal and vertical zoom ON/OFF switches 49a, 49b at ON state is performed by one step in horizontal or vertical direction.

The enlarge method will be described. First, the display picture element number of the image display panel 53 is made vertical M × horizontal N. Next, the image data corresponding to one picture element of the image display panel 53 is made vertical m × horizontal n dots This means that the image data of m × n are projected in multiple projection on one picture element of the display panel 53. In this embodiment, when M=64, N=40, the picture element pitch=0.5 mm, the image data is set to m=8, n=4 at the standard state In this case, 512×160 data dots are displayed on the display panel 53 at the same time. In general, (M×m)×(N×n) data dots are displayed on the display panel 53.

When the zoom up is performed, m is decreased by one at ON state of the vertical switch 49b, and n is decreased by one at ON state of the horizontal switch 49a. Thereby the number of data dots with respect to one display picture element is decreased. As a result, the display is enlarged. Minimum value of m, n is made one, and value less than one is not taken.

Figure 13:
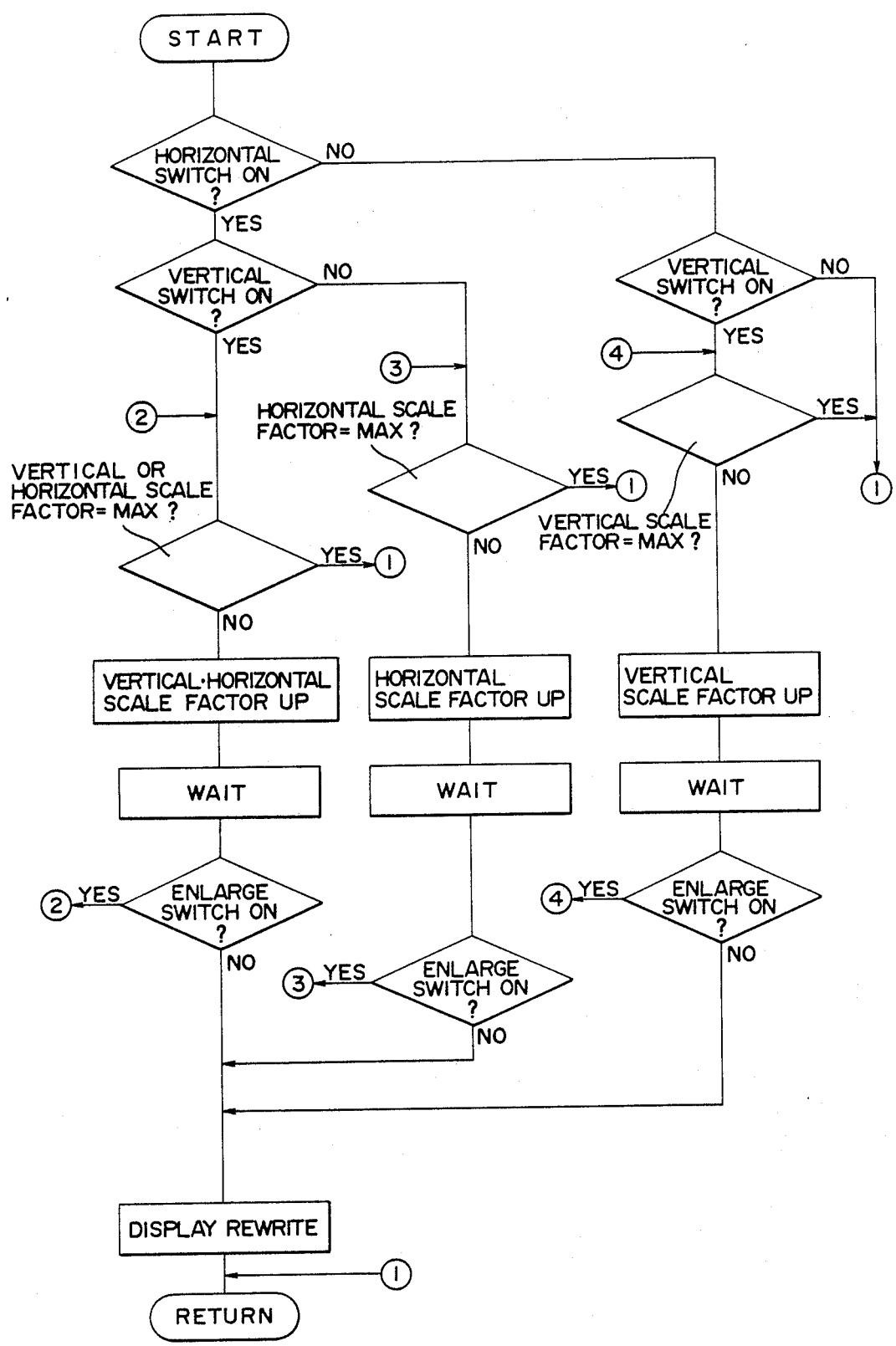
FIG. 13 is a flow chart of enlarge.
Figure 14:
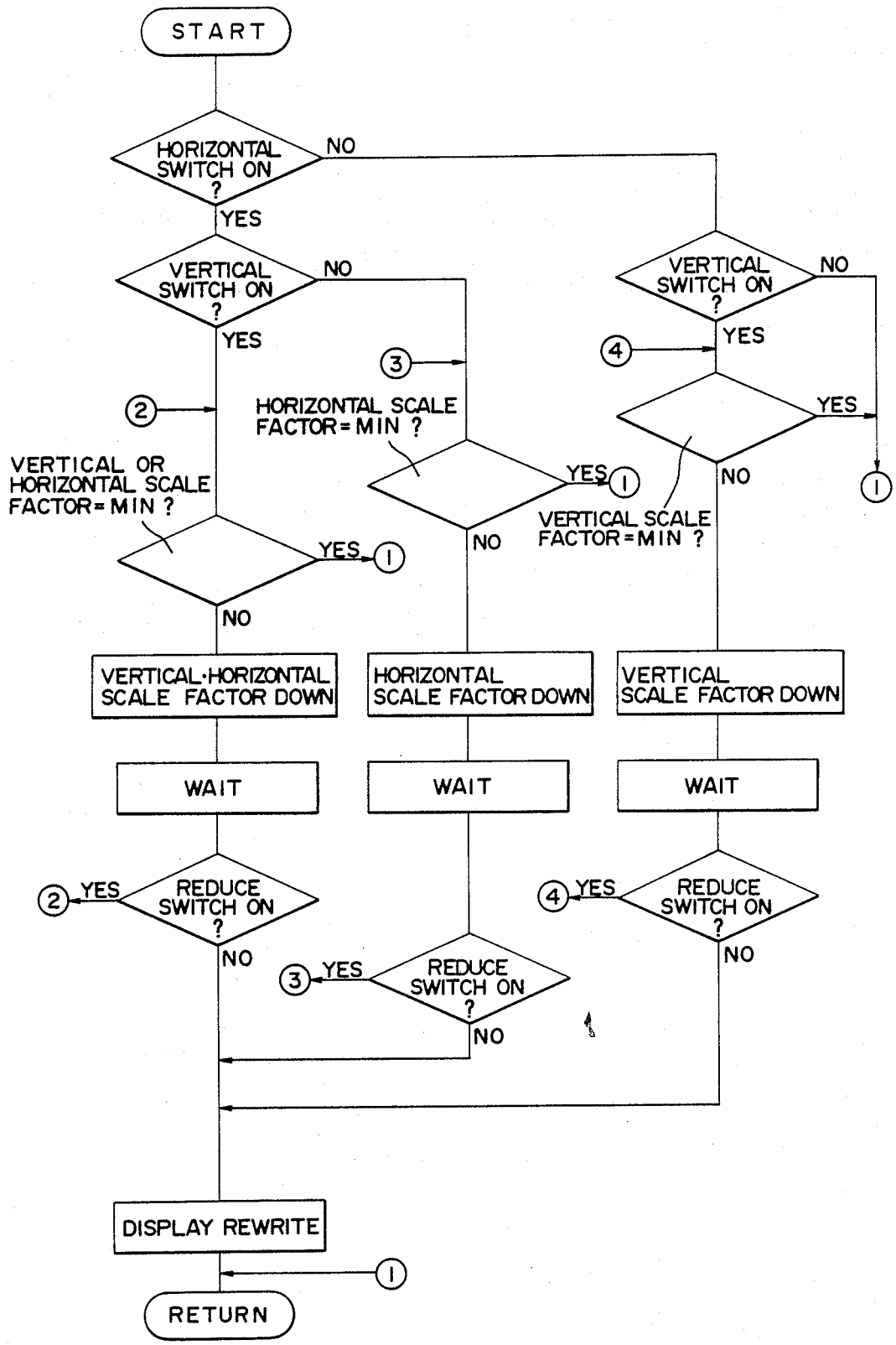
FIG. 14 is a flow chart of reduce.

FIG. 13 is a flow chart regarding the zoom up. The zoom down can be performed in similar manner. In this case, restriction of m and n becomes m≦(vertical dot number of input), n≦(horizontal dot number of input). FIG. 14 is a flow chart of the zoom down.

When the scale factor initialization switch 46 is depressed during the above operation, m and n are returned to the preset value (m=8, n=4) and initialized. The image display in the standard state can be obtained easily.

The zoom function is important in moving type copying apparatuses Because, since realization of the high density liquid crystal display having the same picture element density as that which has been read is nearly impossible in the present technical level, in order that one read picture element corresponds to one displayed picture element, a very large display panel will be required for the whole display. On the contrary, in a display panel of suitable size (display panel having width nearly equal to the reading width), only a small fraction of the image data can be displayed.

When the edit work is performed, the image as a whole must be viewed and at the same time details must be seen carefully. In order to perform this, display of the whole image at high resolving power is the most suitable. However, this is not practicable in the apparatus directed by the embodiment because of the above-mentioned reason.

This problem can be solved by having the zoom function. That is, if the scale factor of display is decreased, the image as a whole can be grasped well. On the contrary, if the scale factor is increased, details of the image can be seen at high accuracy as if they were seen through a magnifier.

Of course, when enlarged, only a small fraction of the image can be displayed as above described, but any part of the image can be seen by means of roll up/down and image shift function as hereinafter described.

On the contrary, when the whole image is viewed in the reduce display, accuracy of display with respect to the original image is deteriorated. However, this corresponds to that when the image is seen from remote position the image looks as if it passes through a spatial low pass filter. Consequently, this is superior as intuitive man.machine interface.

(2) roll up/down function

Figure 16:
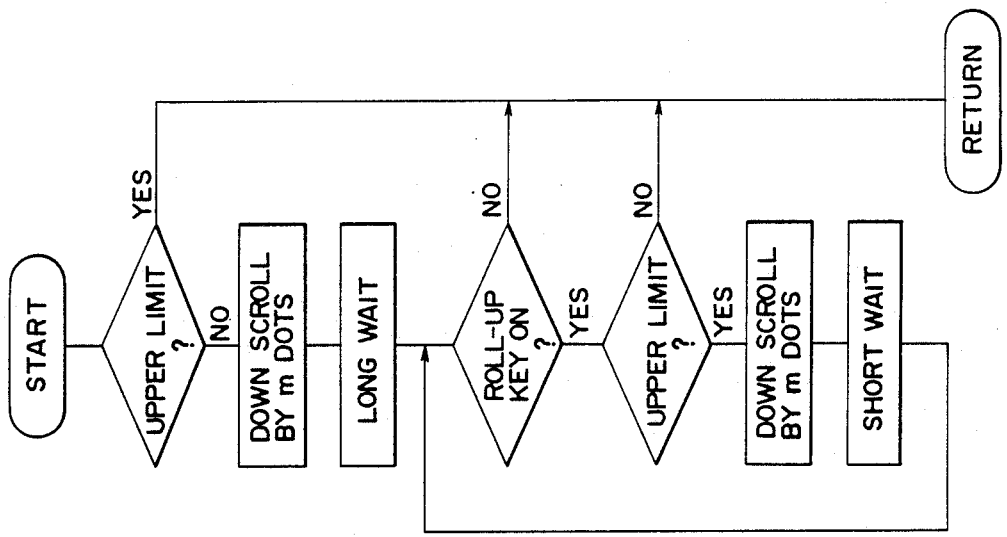
FIG. 16 is a flow chart of roll up.
Figure 15:
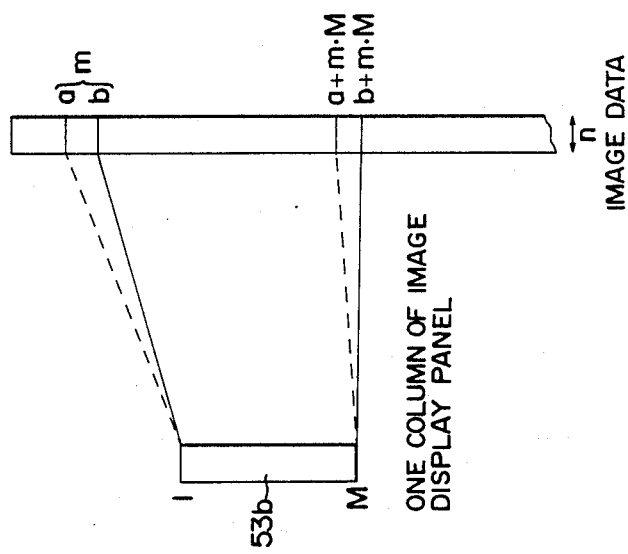
FIG. 15 is a diagram illustrating upward image shift by roll up.
Figure 17:
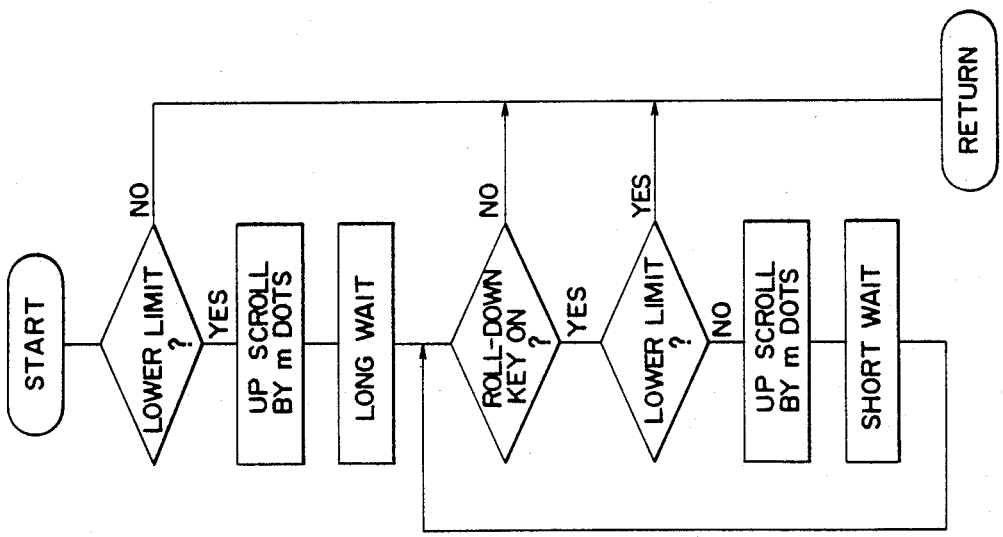
FIG. 17 is a flow chart of roll down.

For example, when the roll up switch 45a is pushed, the image on the display panel 53 is shifted upward by one picture element of the display panel 53, i.e., by m dots of the image data. FIG. 15 shows this relation. In FIG. 15, numeral 53b designates one column (M picture elements) of the image display panel 53, wherein b=a+m. If the roll up switch 45a continues to be pushed, the image is shifted at high speed continuously. FIG. 16 is a flow chart regarding the roll up. Similar relation applies to the roll down, and FIG. 17 is a flow chart regarding the roll down.

The roll position display unit 52 is installed to indicate the present display position. When the vertical dot number regarding one row of the image data is made l, the roll position display unit 52 displays the indicator 52a at position of ratio a/l from the top so as to indicate position of the scroll window. This is rewritten together with the scroll key input, and the most fresh position is indicated.

(3) image shift function

Figure 18:
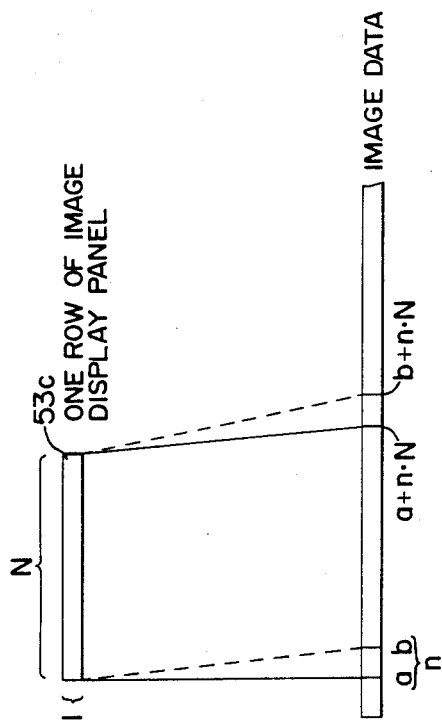
FIG. 18 is a diagram illustrating left image shift.

For example, if the shift switch 45c is pushed, data on the display panel 53 is shifted to the left by one picture element of the display panel 53, i.e., by n dots of the image data. FIG. 18 shows this relation. In FIG. 18, numeral 53c designates one row of the image display panel 53, wherein b=a+n. The image shift function is similar to the roll up/down function regarding high speed operation. FIG. 19 is a flow chart regarding the above operation. Similar relation applies also regarding the shift switch 45d. FIG. 20 is a flow chart regarding the right shift in this case.

The image shift function can be utilized to align the printing start position. According to this function, the write start position of printing in plural lines can be easily made coincident.

In the prior art, during reading the image, the reading start position of each line must be aligned with the greatest care. Also during writing, the write start position of each line (i.e., set position of the apparatus with respect to the recording paper) must be aligned with the greatest care. Moreover, the image position in each line always produces a slight slip due to error at the set state.

In the embodiment, after finishing printing of one line (where the line end is detected on the memory by the CPU and the printing is finished automatically, and blank is outputted after the data end of one line), the apparatus is reset, i.e., the line feed is performed and the printing is started again. During the line feed, the image data to be printed at the printing start position can be easily aligned. In usual, since the reading start position of each line is not coincident during the reading, the image data corresponding to each line is not coincident. However, the printing start position can be aligned using the image shift mechanism.

In this method, although the setting accuracy of the apparatus may be very rough during the read/write action, the printing position can be aligned finely. Consequently, this method is quite convenient in the practical use. This function can be also used to skip an unnecessary portion during the printing. In this case, the unnecessary portion is only shifted in similar manner to the above description, thereby the unnecessary portion can be omitted. This is particularly convenient when a long blank portion exists in the image data.

(4) memory clear

In usual, the input data is not cleared but accumulated. Thereby output of the same image can be performed several times, that is, the same image output can be performed plural times, and further the effective utilization of the edit function becomes possible. However, if the memory becomes full, erase is required.

In the embodiment, if the start/stop switch 43 and the mode switch 42 simultaneously continue to be pushed for a prescribed time (e.g., for one second), the memory clear is performed. Thus erase of the data can be performed simply.

When the memory becomes full, input is discontinued and the memory full "FULL" is displayed. If the start/stop switch 43 is pushed in this state, data is forcedly written from the top position of the memory. In this case, data already stored in the corresponding memory position can be erased.

As a result, even if the memory becomes full while the continuous input is being performed from midway position of the memory, the data can continue to be inputted further without erasing data inputted until then. Moreover, all input data can be stored normally. However, batch input of amount beyond the memory size is, of course, impossible.

(5) line end processing

In the prior art, since consideration is not paid particularly to the line end, input is only discontinued at position of line feed or data end, thereby if next input is started again the data will be continued to the already stored data. As a result, the data will be continued naturally at the output state. In order to stop the printing well at the line feed position, there is no way except that the operator sees the printed image carefully and moves the apparatus. However, in this method, even if care is taken, it is quite difficult to stop the printing accurately to the desired position. Moreover, work of aligning the printing position after the line feed is nearly impossible.

Consequently, in the processing, when data of plural lines exists in the memory and the output is performed, if the output of data by one line is performed and further the moving of the apparatus is continued, prevention of the output of data of next line is intended and also aligning of the output position of data extending over plural lines is intended.

Operation will now be described. If the printing is started and then attains to the line end position inputted at the input state, the line end display unit 44 is lit and subsequent printing is stopped. Since then, even if the apparatus is moved, the printing is not performed. If the start/stop switch 43 is pushed in this state, the line end detection is performed and data of next line is can be printed. The line feed operation of the apparatus is performed and printing of next line is started. FIG. 21 is a flow chart of the line end processing with the print timing detection.

Although the embodiment relates to application to the apparatus where input and output of data of character or image are possible, the invention can be, of course, applied also to a recording apparatus in single body where data of image previously inputted by a separate reading apparatus or a separate machine is taken or transferred and then recorded.

According to the embodiment of the invention as above described, since the edit function is provided, record of image or character by a moving type recording apparatus becomes quite convenient. Particularly, image data at any position is called during recording and can be set to the printing top position, thereby the printing start position of each line during the line feed can be aligned. Regarding position to be printed later, unnecessary data portion such as the top blank can be deleted. Further, the enlarge/reduce display of the stored image data becomes possible, and the edit of data can be performed at high accuracy. Moreover, after data by one line is recorded, the line feed is urged, thereby the output position of the data record extending over plural lines can be aligned.

A simple copying apparatus of moving type which is moved by hand pushing and performs scanning as an embodiment of the invention will be described. The copying apparatus has read function of reading image or character and record function of recording (writing) the read content onto a recording paper as a record medium.

FIG. 22 is a perspective view of the simple copying apparatus A as a whole. On the top surface of the apparatus A, a main power source switch 61 of lever type, a read/record switch 62 for changing read mode and record mode, a mode change switch 63 for changing range (width and length) of read or record by pushing operation, and a monitor display unit 64 for displaying the read fresh content or the like are installed. On a side surface, a start/stop switch 65 for changing starting action and finishing action is installed.

On the other hand, in the bottom surface, as shown in FIG. 23, in the travelling direction (arrow Y direction) from the reverse side (left side in the figure), a read window 66, a travelling reference roller 67 of lengthy form, a record window 68, and a travelling auxiliary roller 69 of lengthy form are arranged, and the center of gravity is set to position between both rollers 67, 69, so that the stable attitude in horizontal and vertical directions can be secured during the travelling.

Figure 24:
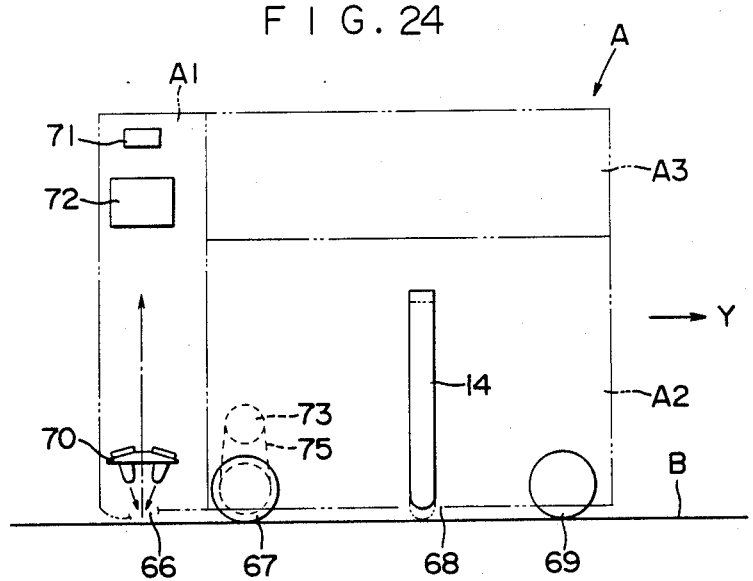
FIG. 24 is a diagram illustrating a schematic mechanism of the apparatus.

Inside of the simple copying apparatus A is composed of a reading section A1, a recording section A2 and a storage/control section A3 as shown in FIG. 24.

The reading section A1 is composed of an illumination light source 70 comprising a light emission diode group arranged in X direction (perpendicular direction to the paper surface in FIG. 24) so as to perform the light illumination downward from the read window 66, and a lens 72 for condensing/focusing the image light reflected at a surface to be read onto a read image sensor 71 comprising CCD, MOS solid image pickup element or the like. The image sensor 71 reads the image of the surface to be read in synchronization with synchronizing signals generated per definite moving amount in Y direction from an encoder 73 installed at the recording section A2.

In the recording section A2, reference surface B (being surface of the recording paper or the surface to be read) is constituted by the lowest surface of each of the travelling reference roller 67 and the travelling auxiliary roller 69, and a record head (thermal head) 74 faces to the reference surface B through the record window 68. The record head 74 is provided at the top end with a plurality of heater elements arranged in the longitudinal direction (perpendicular direction to the paper surface in FIG. 24), and contacted with the reference surface B at suitable pressure by receiving the spring force in the downward direction. The record head 74 can be housed upward at the unrequired state. The encoder 73 is coupled with the travelling reference roller 67 through a belt 75. In the recording section A2, record to the recording paper arranged on the reference surface B is performed by synchronizing signals generated from the encoder 73 per definite moving amount of the apparatus A as a whole.

Figure 25:
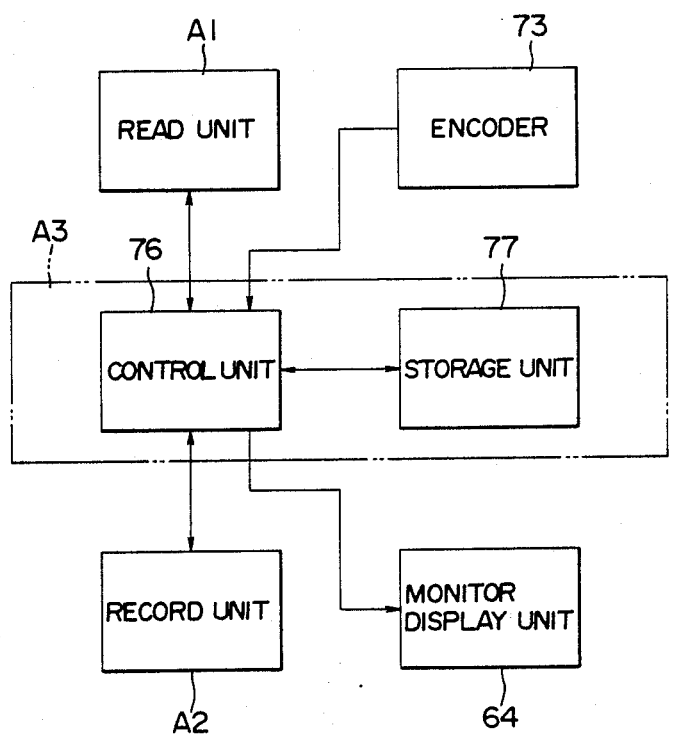
FIG. 25 is a block diagram illustrating function of the apparatus.

FIG. 25 is a diagram showing the inside in blocks. The storage/control section A3 comprises a control unit 76 including CPU, ROM, I/O port, and a storage unit 77 including RAM, floppy disc or the like.

Figure 26:
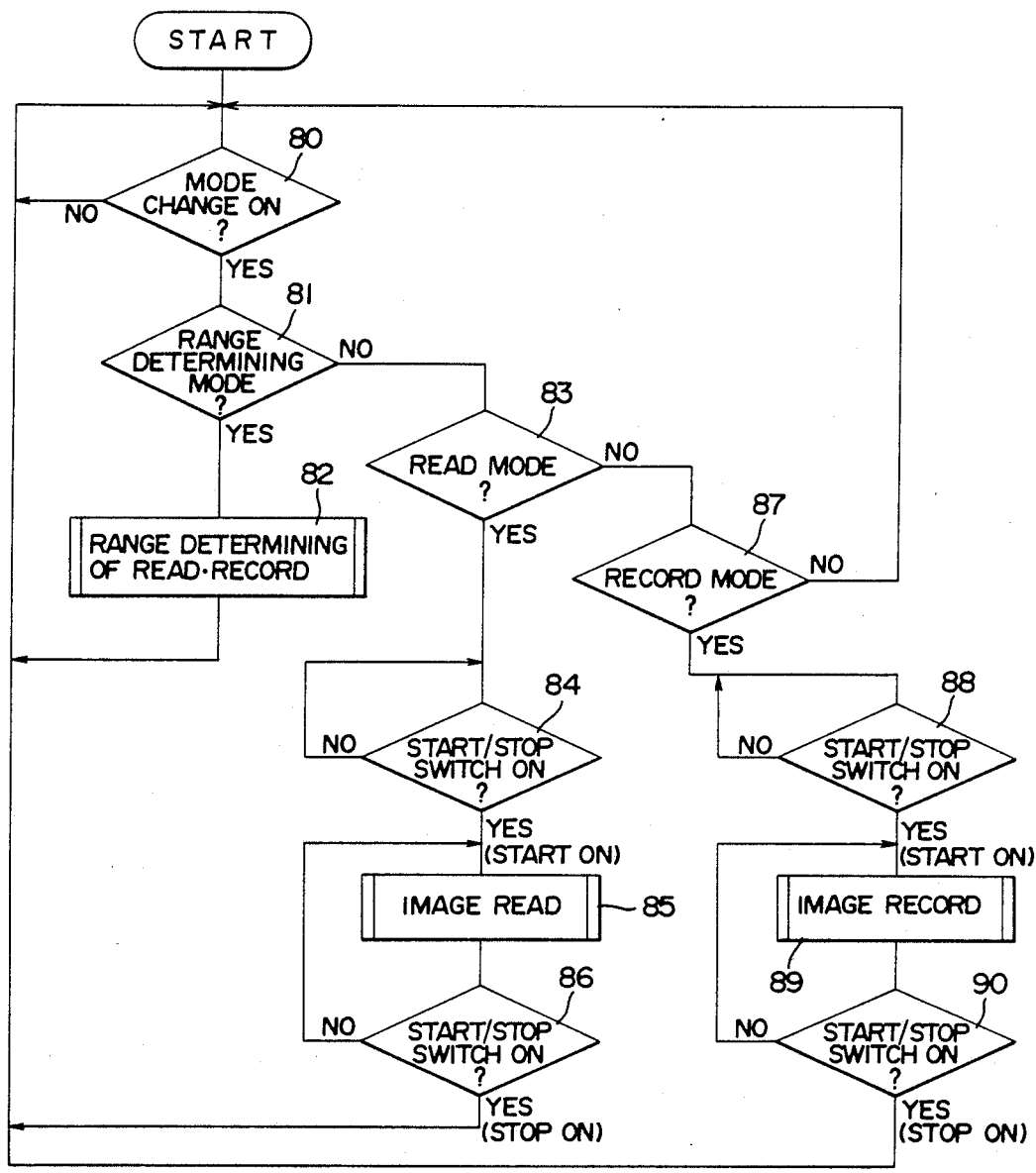
FIG. 26 is a flow chart illustrating operation of the apparatus.

FIG. 26 shows a function flow for the read action and the record action of the apparatus A. Control operation after the power source turned on is performed by the read/record switch 62, the mode change switch 63 and the start/stop switch 65.

Step 80 becomes YES by the mode change switch 63 turned on. Step 81 is a step to discriminate whether the range (length and width) for read action or record action should be determined or changed. Step 81 becomes YES by the start/stop switch 65 turned on, and becomes NO by the mode change switch 63 turned on. Step 82 is a step to select one range among predetermined plural sorts of ranges by pushing the start/stop switch 65 in prescribed times. Step 83 is a step to select whether the read mode or not, and becomes YES by pushing the record/read switch 62 once. Step 84 is a step to discriminate the read start, step 85 is a step for the read action, and step 86 is a step to discriminate the read finishing (stop). Step 87 is a step to select whether the record mode or not, and becomes YES by pushing the record/read switch 62 twice. Step 88 is a step to discriminate the record start, step 89 is a step for the record action, and step 90 is a step to discriminate the record finishing (stop).

Detecting means of the invention is applied to such copying apparatus where the record is performed by the moving scanning of plural times.

Figure 27:
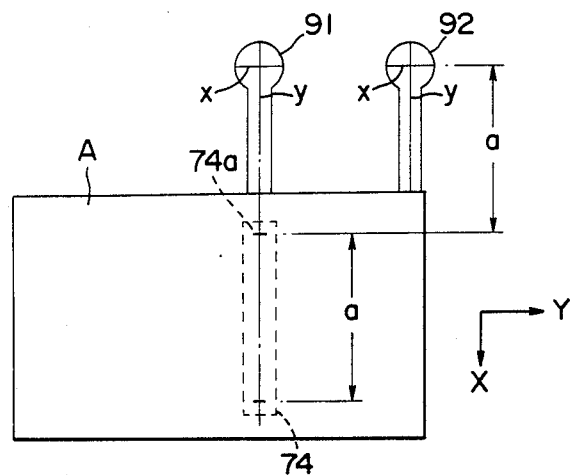
FIG. 27 is a plan view of a copying machine having a detecting means.

The detecting means of the embodiment as shown in FIG. 27 comprises a mark 91 installed in direction along line of the main scanning direction X from the first dot 74a of the heater element in the record head 74 of the body A of the copying apparatus and at position projecting to the left side surface of the travelling direction Y by distance corresponding to the record width a, and a mark 92 installed at side of the travelling direction in the same side surface. Any of the marks 91, 92 is molded by a transparent material, and cross lines x, y are marked at the top end. Line y in one mark 91 extends to the side surface of the body A so that it is coincident with the main scanning direction of the recording head 74. Line y in other mark 92 also extends to the side surface of the body A. Lines x of both marks 91, 92 are in the coincident level position (level remote from the first dot 74a by distance a).

Figure 28:
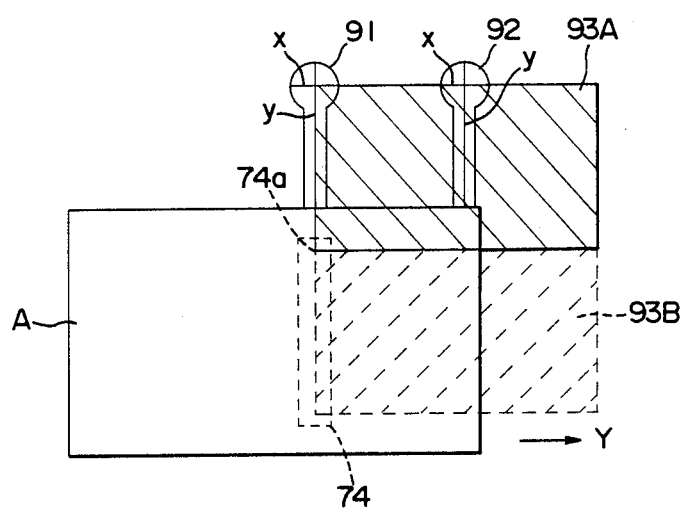
FIG. 28 is a diagram illustrating record according to the copying apparatus shown in FIG. 27.

In the detecting means of the embodiment, as shown in FIG. 28, setting is performed so that lines x of the marks 91, 92 are coincident with the top end of the first record part 93A which is previously scanned and recorded, and line y of one mark 91 is coincident with the left end of the first record part 93A, and then the positioning is performed and the position is made the start point of the present scanning. The second record part 93B is formed by the subsequent scanning in the arrow Y direction.

Both marks 91, 92 are preferably arranged as close as possible to portion of the recording paper in range not to obstruct the travelling of the apparatus A. One mark 92 is not always required.

Figure 29:
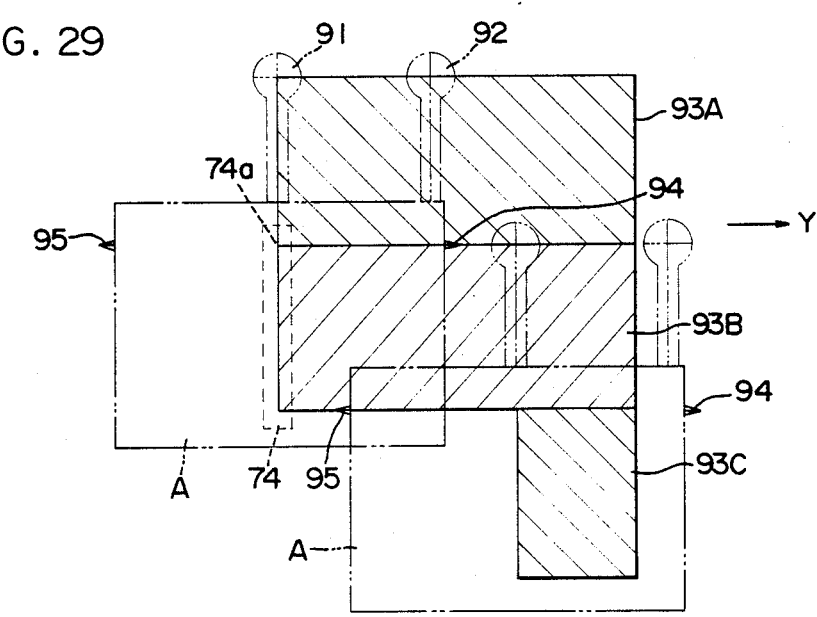
FIG. 29 is a diagram illustrating use of a copying apparatus having a detecting means as a modification of the detecting means shown in FIG. 27.

FIG. 29 shows a modification of the detecting means of the embodiment shown in FIG. 27. Indexes 94, 95 projecting from the apparatus A are added to positions at the front surface and the rear surface in the travelling direction Y corresponding to the first dot 74a of the record head 74.

If the indexes 94, 95 are provided as above described, in order to form the second part 93B adjacent to the first record part 93A, not only the marks 91, 92 are made coincident with the top end or the left end of the first record part 93A but also one index 94 can be made coincident with the bottom end of the first record part 93A thereby the positioning is simplified. In order to form the third record part 93C at the right bottom side of the second record part 93B, the index 95 is used to make coincident with the bottom end of the second record part 93B in place of the index 94.

Figure 30:
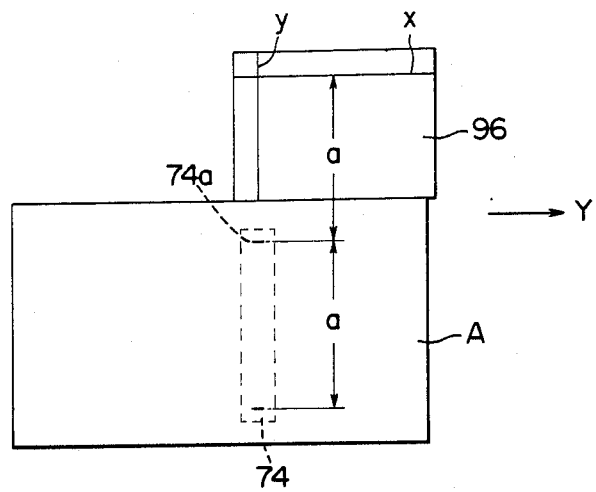
FIG. 30 is a plan view of a copying apparatus having a detecting means as another embodiment.

FIG. 30 shows a detecting means as another embodiment. In the detecting means of the embodiment, a transparent plate 96 is installed at the left side in the travelling direction of the apparatus A, and lines x, y are marked on the top surface of the transparent plate 96. Line y is coincident with the main scanning direction of the record head 74, and line x is located remote from the first dot 74a of the record head 74 by the record width a. Use method of this embodiment is quite similar to that of the embodiment shown in FIG. 27.

Figure 31A:
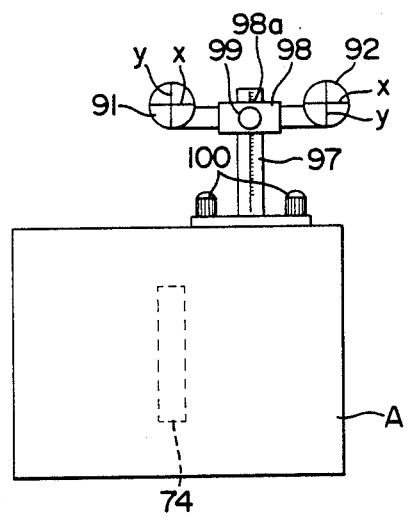
FIG. 31(a) is a plan view of a copying apparatus having a detecting means as still another embodiment.
Figure 31B:
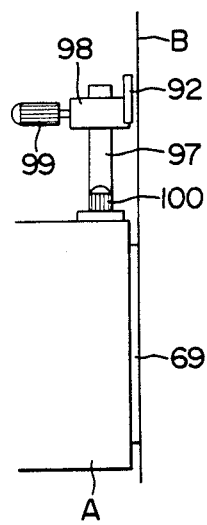
FIG. 31(b) is a fragmentary front view of the apparatus.

FIG. 31 shows a detecting means as still another embodiment, which can deal with variation of the record width. If the reading is performed always at the maximum read width during the read action, the end in the width direction may be laid on character to be read. In order to prevent this state, the read width is narrowed. Similar condition occurs also when width of data to be read is narrow.

In order that such read data is stored and recorded, the positioning of the apparatus may be performed using methods described in the above-mentioned several embodiments, but the record width a must be set to the adjusted width (e.g., a').

In the detecting means of the embodiment shown in FIG. 31, a support rod 97 with scale is fixed to the left side surface in the travelling direction Y of the apparatus A, and a mark supporter 98 having marks 91, 92 is installed to the rod 97 using a screw 99. The scale of the support rod 97 is marked by numerals representing the record width. If the end surface 98a of the mark supporter 98 is made coincident with the scale, lines x of the marks 91, 92 become indexes representing the record width.

If the support rod 97 with scale is installed using a screw 100 as shown in the figure, the support rod 97 may be installed only at the necessary state (during record) and may be detached at other state. Consequently, the unnecessary projection is eliminated at non-use state or during reading, so as to avoid the condition that hooking of the projection during the read scanning results in the abnormal scanning or that the projection collides on other substance and is broken. Since the apparatus as a whole becomes compact, the treatment also becomes easy.

Figure 32A:
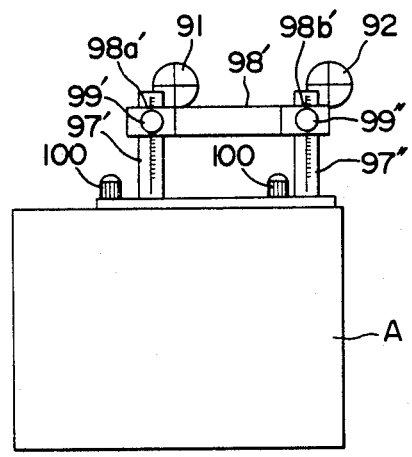
FIG. 32(a) is a plan view of a copying apparatus having a detecting means as a modification of the detecting means shown in FIG. 31.
Figure 32B:
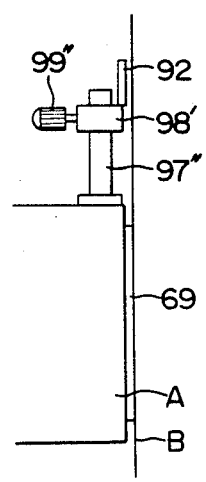
FIG. 32(b) is a fragmentary front view of the apparatus.

FIG. 32 shows a modification of the detecting means in the embodiment of FIG. 31. Two similar support rods 97', 97" are used in place of one support rod 97 with scale. In such constitution, parallel property of the marks 91, 92 to the apparatus A becomes well. In order to move the marks 91, 92, two screws 99', 99" are loosened, and two end surfaces 98a', 98b' of the mark supporter 98' are aligned to prescribed positions of the scale of the support rods 97', 97" with scale, and then the screws 99', 99" are tightened and fixed.

FIG. 33 shows a detecting means as still another embodiment. In the detecting means of the embodiment, a transparent plate 101 with pattern having lateral lines is installed to the left end in the travelling direction Y of the body A so that no position adjustment of the mark but dimension of the record width can be confirmed. Line x of pattern of the transparent plate 101 used here is made line xo at the position corresponding to the maximum value of the record width. Line passing through the center position of the record head 74 is made y, and lines xn are marked at spacing of 1 mm for example. Value of the record width corresponding to every several lines xn is marked.

If the record width is varied, line corresponding to the width among lines xn and line y are taken as reference, and the positioning is performed, thereby the initial setting of the apparatus A can be performed simply.

Even if the transparent plate 101 is moved as shown in FIG. 31 or FIG. 32, similar effect can be obtained. The transparent plate 101 can be installed only at the necessary state (only during recording) using the mounting screw 100.

Although the detecting means is fixed or detachably installed in the above description, FIG. 34 shows a detecting means of another embodiment where the detecting means is housed in the inside at the unnecessary state and taken out only at the necessary state. Numeral 102 designates a transparent thin sheet member with flexibility, and pattern of lines x, y is marked on the surface. If the transparent thin sheet member 102 is drawn out of the apparatus A and stopped at the position where numeral marked on the pattern corresponds to the record width, line xo becomes reference line and positioning can be performed by aligning the reference line to the top end of the first record part 93A in similar manner to the above description. The transparent thin sheet member 102 is wound to a taking roller 103 at inside of the apparatus A and fed through a holding roller 104. Numeral 110 designates a stopper.

FIG. 35 shows a modification of the detecting means in the embodiment of FIG. 34, and a transparent thin sheet member 105 with pattern formed as above described may be housed rotatable. In the embodiment, the record head 74 faces to outside through the record window or is retreated to inside by a lever 106 (with elastic force by a spring so that the top end is pressed against the shaft 74b of the head 74), and one end of a wire 107 is locked to the lever 106 and other end thereof is turned by a roller 108 and coupled to the transparent thin sheet member 105. If the outer end of the lever 106 is removed from a step 109b of a hole 109a of a side plate 109, the record head 74 is lowered and at record read state and the transparent thin sheet member 105 is set as shown in the figure. On the contrary, if the outer end of the lever 106 is pushed downward and locked to the step 109b, the record head 74 is retreated upward and the transparent thin sheet member 105 is rotated and stands at the side surface of the apparatus and is retreated, thereby the whole apparatus becomes compact.

Regarding the record width, when the memory content can be displayed on the monitor display unit 64 of the apparatus, if distance from the first dot is previously written on the display unit, the record width can be easily confirmed by the value.

When the record width is determined, in the method as above described, spacing between the last line of record and the first line of next record must be contained in the record width.

According to the embodiment of the invention as above described, since the detecting means for positioning is installed, a ruled line is not required in the recording paper and overlapping or lacking can be avoided during adjacent recording, thereby the accurate recording can be performed.

Figure 36:
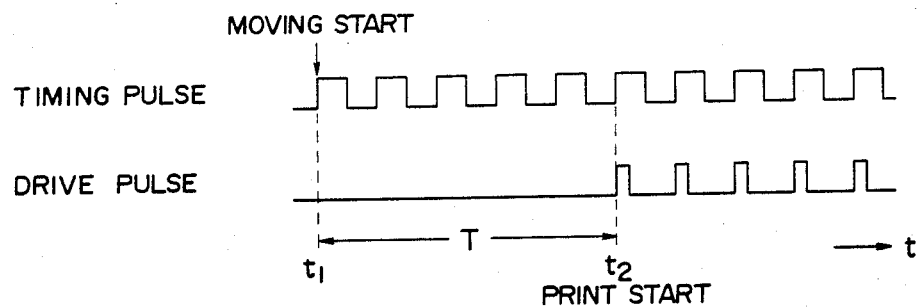
FIG. 36 is a timing chart illustrating another embodiment where the invention is applied to an image forming apparatus of manual moving type.

Still another embodiment of the invention will now be described. FIG. 36 shows output timing of an image recording apparatus A of manual moving type. That is, after moving of prescribed distance, i.e., lapse of time T from the first rise timing t1 (moving start point) of timing pulse obtained from an encoder 117, rise timing t2 is obtained, and drive pulse is applied to printing element of a record head 113 after the rise timing t2.

In this case, methods to obtain the timing t2 include ① that printing is not performed corresponding to pulses of prescribed number from the beginning of timing pulses and then drive pulses are generated for the printing, and ② drive of printing is started at receiving generation of the first timing pulse and the printing content is previously set to the memory so that the first prescribed pulse number becomes blank (no printing).

The pulse number corresponding to the delay time T shall be number corresponding to distance of the apparatus A travelling after the moving start of the apparatus A until a ribbon 114 is begun to be fed effectively or corresponding to a longer distance. The distance is within 3~4 mm and preferably about 1 mm or within 1 mm. In this case, since the operator scarcely feels the printing slip, the printing start need not be informed to the operator.

Figure 37:
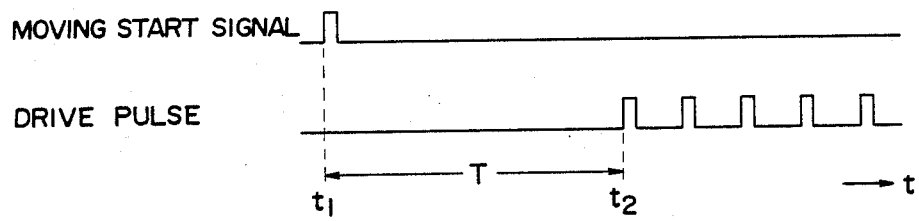
FIG. 37 is a timing chart illustrating an embodiment applied to an image forming apparatus of self moving type.

On the other hand, regarding an image forming apparatus of self moving type, since the moving start signal is outputted as shown in FIG. 37, pulse to drive the record head is outputted after moving by prescribed distance, i.e., after lapse of the time T.

Figure 38:
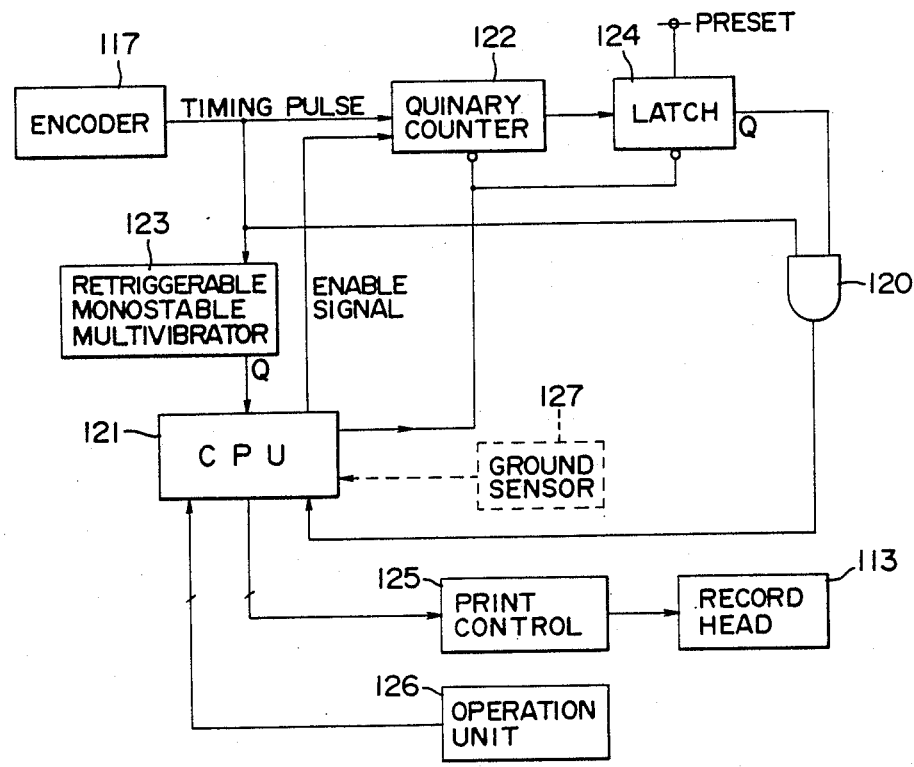
FIG. 38 is a block diagram in application to an image forming apparatus of manual moving type.

FIG. 38 shows circuit blocks to realize the above-mentioned method ① that printing is not performed corresponding to pulses of prescribed number from the beginning of timing pulses and then the printing is performed.

Timing pulse from the encoder 117 passes through AND gate 120 and is inputted to CPU 121 thereby various sorts of timing can be determined. Also the timing pulse is inputted to a quinary counter 122 and a retriggerable monostable multivibrator 123. If the quinary counter 122 counts five input pulses, output Q of a latch 124 of next stage becomes H by the carrier output and gate of the AND gate 120 is opened. Output Q of the monostable multivibrator 123 becomes L, thereby the quinary counter 122 is cleared through the CPU 121 and output Q of a latch 124 becomes L. Numeral 125 designates a print control unit to control the record head 113, and numeral 126 designates an operation unit.

In this circuit, if time constant of the monostable multivibrator 123 is set to one second for example, the timing pulse from the encoder 117 is stopped for one second or more (moving of the apparatus is stopped), and output Q of the monostable multivibrator 123 becomes L. This is detected by the CPU 121, and the quinary counter 122 is cleared and output Q of the latch 124 becomes L. In this state, gate of the AND gate 120 is closed.

Figure 39:
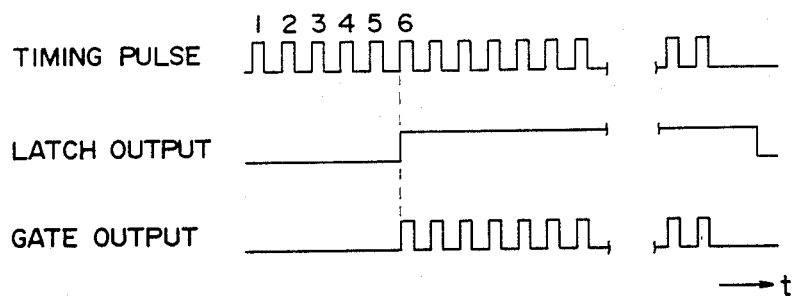
FIG. 39 is a timing chart of operation of the circuit in FIG. 38.

If the apparatus A is moved again and the printing is started again, timing pulse from the encoder 117 is outputted. However, since the AND gate 120 is closed, the pulse is not inputted to the CPU 121. If five timing pulses are outputted, the counter 122 changes output Q of the latch 124 into H, thereby the AND gate 120 opens gate in this state and timing pulses from sixth are transmitted to the CPU 121. FIG. 39 shows a timing chart of the above operation.

That is, the timing pulses and the image data signals are outputted simultaneously to the printing. However, printing is not performed by five pulses, and after moving by prescribed distance the printing is started.

In place of the retriggerable monostable multivibrator 123, a ground sensor 127 constituted by microswitch may be used. In this case, the apparatus is elevated from the substance to be recorded and the ground sensor 127 is set to detect it, thereby output Q of the latch 124 is made L at the elevating state of the apparatus and gate of the AND gate 120 can be closed.

Figure 40:
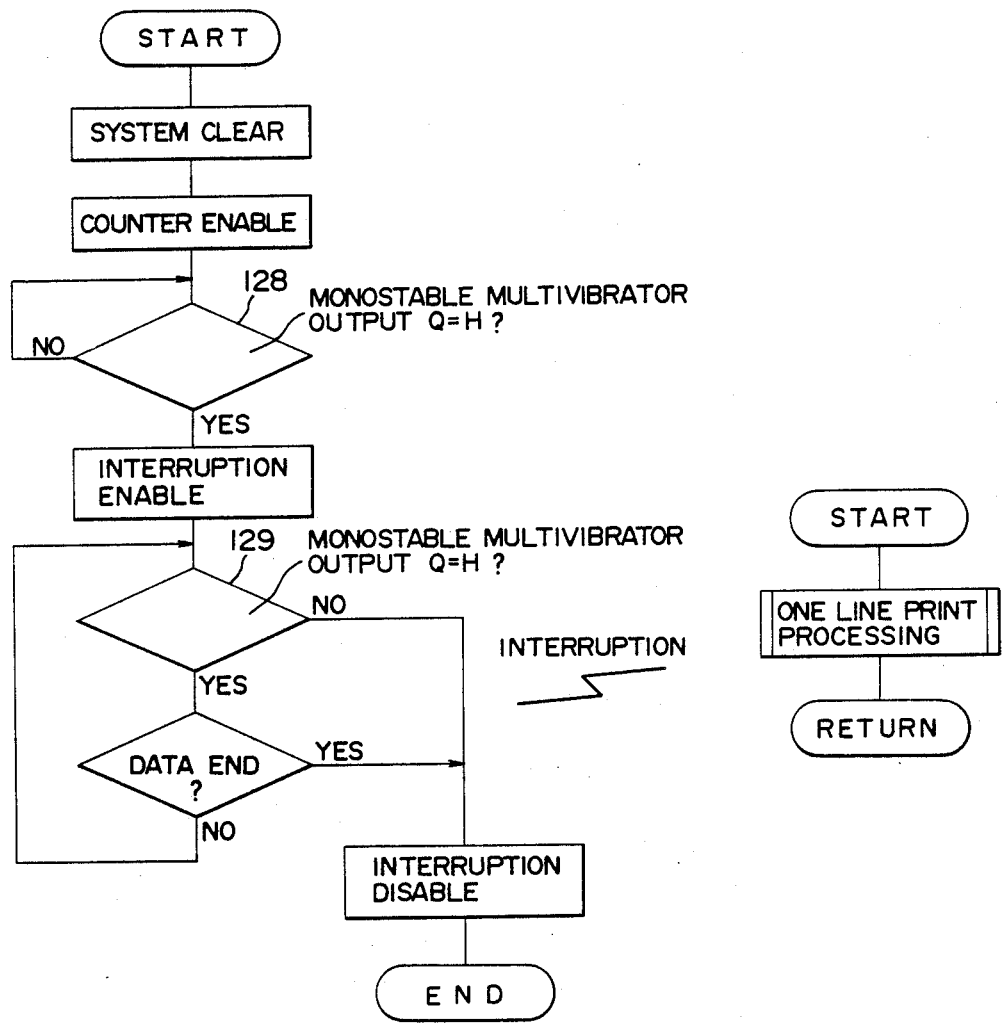
FIG. 40 is a flow chart of apparatus control in utilization of the circuit in FIG. 38.
Figure 44:
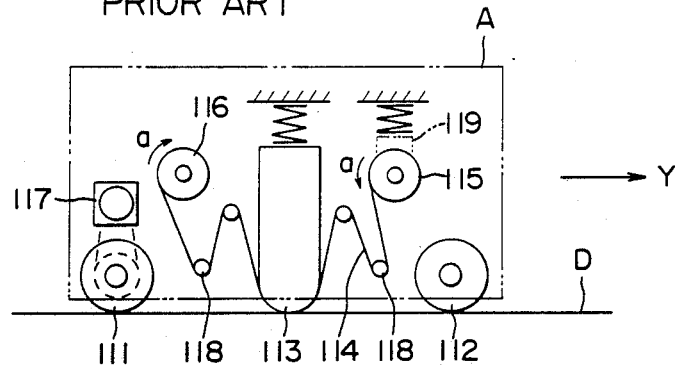
FIG. 44 is a schematic constitution diagram of an image forming apparatus of usual manual moving type in the prior art.
Figure 45:
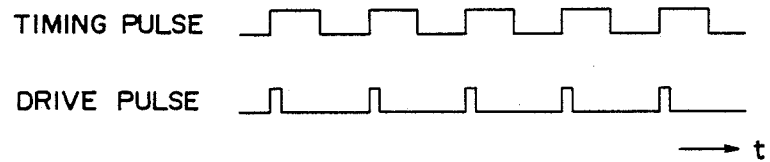
FIG. 45 is a timing chart of drive pulse in the prior art to drive timing pulse and record head in the apparatus of FIG. 44.

FIG. 40 is a flow chart in the case that the printing is performed actually after lapse of a prescribed time from generation of the first timing pulse. Interruption in this case is performed to printing processing step portion of one line in the main routine. When the ground sensor 127 is used in place of the retriggerable monostable multivibrator 123, the discrimination steps 128, 129 are converted to "Whether the ground sensor detects grounding or not?".

Although the print data of prescribed pulse number, i.e., by prescribed distance is controlled by the CPU and the printing is not performed in the example of above description, the drive voltage may not be applied to the record head by prescribed pulse thereby the printing is not performed.

FIG. 41 is a block diagram to implement the above-mentioned method ② that drive of printing is started at receiving generation of timing pulse and the printing content is previously set so that the image data by five pulses at the beginning becomes blank.

In FIG. 41, like parts to that in FIG. 39 are designated by the same reference numerals. If the timing pulse is stopped and next timing pulse does not come after lapse of the time constant of the retriggerable monostable multivibrator 123, output Q of the latch 124 becomes L and gate of the AND gate 120 is closed. If next timing pulse comes, output Q of the latch 124 becomes H and the AND gate 120 immediately opens gate and the timing pulse is transmitted to the CPU 121.

In the embodiment, as shown in FIG. 42 and FIG. 43, blank data of time by five pulses of timing pulses after start, i.e., corresponding to prescribed distance is inserted in the memory, and the print processing is performed in sequence similar to ordinary case. That is, if the data to be recorded comes to the end or the timing pulse does not come thereby output Q from the monostable multivibrator 123 becomes L, the print processing by one line is finished.

According to the embodiment of the invention as above described, after the apparatus is moved in a prescribed distance where the ribbon seems to slide on the printing surface of the record head, pulse to drive the record head is outputted, thereby the ribbon always slides on the printing element surface of the record head at the printing start and the double recording on the same position of the ribbon can be securely prevented.

Another embodiment of the invention to control ON/OFF timing of an information reading light source in synchronization with the read timing of the original document information will now be described.

Figure 46:
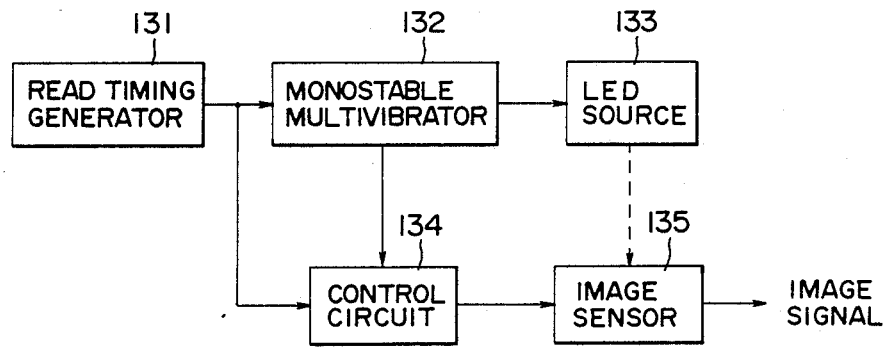
FIG. 46 is a constitution block diagram illustrating another embodiment of the invention.

In FIG. 46, numeral 131 designates a read timing generator constituted, for example, by an optical encoder for generating timing pulse of original document reading, numeral 132 designates a monostable multivibrator receiving output pulse of the read timing pulse generator 131 and generating pulse of prescribed width, and numeral 133 designates an information reading light source receiving output of the monostable multivibrator 132 and illuminating an original document (not shown). For example, an LED light source is used as the information reading light source 133. However, not only the LED light source shown in the figure but also other sorts of light source may be used. the LED is suitable for an information reading light source because variation of the light quantity is little. Numeral 134 designates a control circuit receiving output of the timing generator 131 and output of the monostable multivibrator 132 and driving an image sensor, and numeral 135 designates an image sensor driven by output of the control circuit 134. For example, CCD as above described is used as the image sensor 135. Signal outputted from the image sensor 135 becomes image signal. As the control circuit, hard logic for example may be used or soft logic such as a microcomputer may be used.

Figure 47:
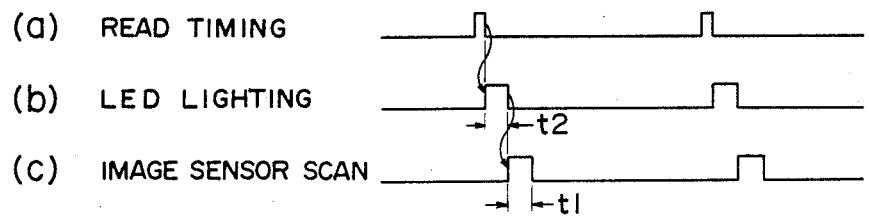
FIG. 47 is a timing chart illustrating operation of the apparatus.

Operation of the apparatus in such constitution will be described referring to a timing chart shown in FIG. 47. Assume that read timing pulses as shown in FIG. 47(a) are generated from the read timing generator 131. The monostable multivibrator 132 is triggered at drop of the read timing pulse, and generates pulse of prescribed time width t2 as shown in FIG. 47(b). The monostable multivibrator 132 lights the LED light source 133 by this pulse. As a result, the LED light source 133 is lit for the period t2 from coming of the read timing pulse and illuminates the original document. During this period, charge is stored in the image sensor 135. The control circuit 134 receives drop of output pulse of the monostable multivibrator 132 and then scans the image sensor 135 in time width t1. As a result, signals stored in charge during the period t2 are shifted in sequence during the period t1 and outputted as image signals.

According to the invention, since the LED light source 133 is lit in synchronization with drop of the read timing pulse for the required exposure time t2, the consumption power is quite little in comparison to the continuous lighting system in the prior art. Consequently, the invention may be preferably used in an apparatus of battery drive system such as an optical information reading apparatus of hand scan system. Also, according to the invention, since the time required from coming of the read timing pulse until outputting of the image signal may be t1–t2, the processing time is short in comparison to the apparatus in the prior art.

Figure 48:
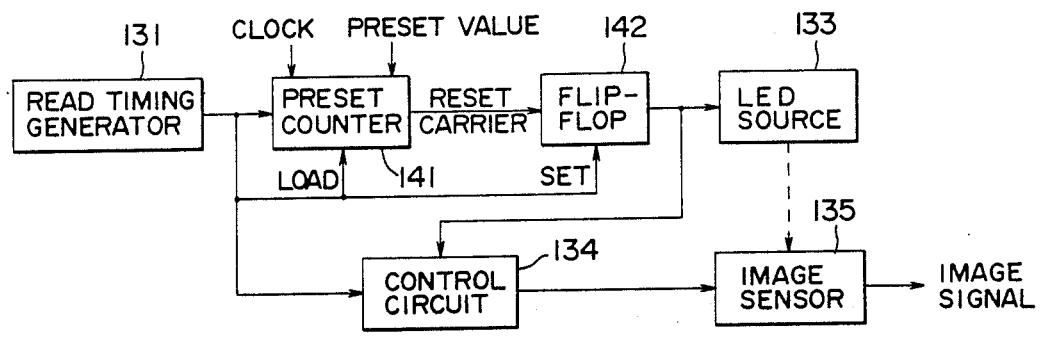
FIG. 48 is a constitution block diagram illustrating still another embodiment of the invention.

FIG. 48 is a constitution block diagram showing another embodiment of the invention. In FIG. 48, like parts to that of FIG. 46 are designated by the same reference numerals. In FIG. 48, numeral 141 designates a preset counter receiving timing signal from the read timing generator 131 and starting count of the clock. Preset value can be previously set to the preset counter 141, and can be set by load signal outputted from the read timing generator 131. Numeral 142 designates a flip-flop receiving count up signal (carrier) from the preset counter 141 as reset signal and receiving timing signal from the read timing generator 131 as set signal. The LED light source 133 is driven by output of the flip-flop 142.

Operation of the apparatus in such constitution will be described. If read timing pulse comes from the read timing generator 131, preset value inputted previously in the preset counter 141 by the read timing pulse is loaded (set). At the same time, the preset counter 141 starts count from the preset value. Further, output of the flip-flop 142 is set to "1". As a result, the LED light source 133 is lit simultaneously to the timing pulse coming.

When the preset counter 141 performs count up, the carrier is outputted and the flip-flop 142 is reset. As a result, the flip-flop 142 is inverted from "1" into "0", and the LED light source 133 is put out. And then the control circuit 134 drives the image sensor 135. As a result, information signals stored in the image sensor 135 during lighting of the LED light source 133 are shifted in sequence by one picture element and outputted as image signals. In the embodiment shown in the figure, preset value to the preset counter 141 is varied thereby the lighting time of the LED light source 133, i.e., the exposure amount can be controlled.

Figure 49:
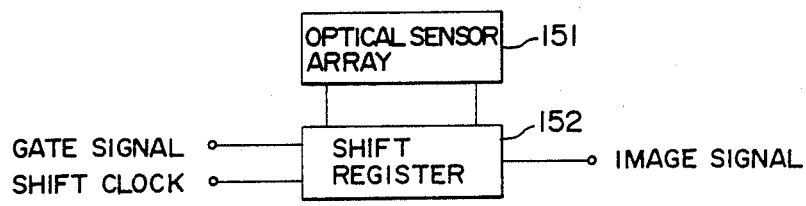
FIG. 49 is a diagram illustrating a concrete constitution example of an image sensor.

FIG. 49 shows a concrete constitution example of an image sensor used in the invention. In FIG. 49, numeral 151 designates an optical sensor array with light receiving elements arranged linearly, and numeral 152 designates a shift register receiving gate signals and shift clock and shifting photoelectric conversion outputs of the optical sensor array 151 in sequence. Output of the shift register 152 becomes image signal (video signal). The light receiving element (photo diode in usual) per one picture element of the optical sensor array 151 and the shift register 152 corresponds in one-to-one relation.

The gate signal serves to provide gate to take the stored charge into the shift register, and the shift clock drives the shift register 152 to perform the shift operation by the gate signal only when the gate is not opened.

Figure 50:
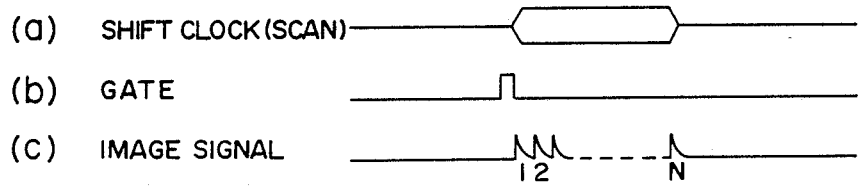
FIG. 50 is a timing chart illustrating operation of an image sensor.

FIG. 50 is a timing chart illustrating operation of the image sensor shown in FIG. 49. In FIG. 50, (a) designates a shift clock, (b) designates a gate signal, and (c) designates a image signal. The gate signal is applied and then the shift clock is generated and scanning is performed thereby the image signals are outputted in sequence from 1 to N (N:total picture element number).

Figure 51A:
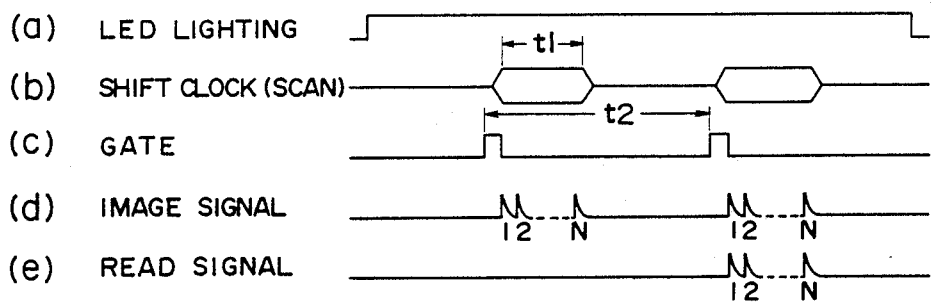
FIG. 51(a), FIG. 51(b) are timing charts of information reading operation in comparison between the prior art and the invention.
Figure 51B:
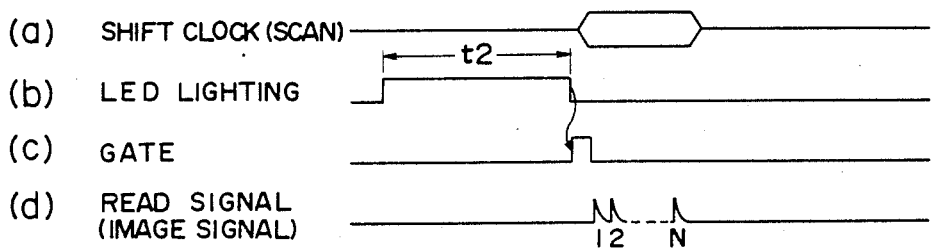

FIG. 51 is a timing chart of information reading operation in comparison of the prior art with the invention. FIG. 51(a) shows the prior art, and FIG. 51(b) shows the invention. In FIG. 51(a), (a) illustrates LED lighting state, (b) illustrates shift clock, (c) illustrates gate signal, (d) illustrates image sensor output (image signal), and (e) illustrates read signal taken into the apparatus. In FIG. 51(b), (a) illustrates shift clock, (b) illustrates LED lighting state, (c) illustrates gate signal, and (d) illustrates read signal taken into the apparatus.

In the case of the prior art shown in FIG. 51(a), scanning is performed twice within the LED lighting period. The first scanning is dummy scan, and charge corresponding to the information amount is stored in the image sensor during this period. Two sets of image signals as shown in (d) are outputted from the image sensor, and the second set is made the read signal.

On the contrary, in the case of the invention shown in FIG. 51(b), the LED is lit by prescribed period as shown in (b) before performing the scanning, and the scanning is performed as shown in (a) after the LED is put out. As a result, only one set of image signal is outputted from the image sensor as shown in (d). This image signal is made the read signal as it is. As clearly seen from comparison of FIG. 51(a) with FIG. 51(b), the LED is in normally lighting state during the read period in the case of the prior art, whereas the LED may be lit during the prescribed period only in the case of the invention. Accordingly, the consumption power becomes little in the invention.

FIG. 52 is an electric circuit diagram illustrating a concrete constitution example of the embodiment shown in FIG. 46. In FIG. 52, like parts to that of FIG. 46 are designated by the same reference numerals. FIG. 53 is a timing chart illustrating operation of each part of the circuit shown in FIG. 52. FIG. 53 corresponds to points S1~S9 in the circuit shown in FIG. 52.

First, if output from the read timing generator 131 is inputted to the monostable multivibrator 132, pulse (Q output) having width according to the time constant determined by product C1R1 of the capacitor C1 and the resistor R1 is outputted and during the period the LED light source 133 is turned on. Input signal S1 to the monostable multivibrator 132 is also inputted to the monostable multivibrator 161, and pulse S4 having width according to the time constant determined by product C2R2 of the capacitor C2 and the resistor R2 is outputted. The pulse S4 clears the flip-flop 162 and the counter 163.

Next, if the LED light source 133 is turned off, $\overline{Q}$ output S3 of the monostable multivibrator 132 rises and the flip-flop 162 is set by the rise thereby Q output S5 of the flip-flop 162 becomes "1". The timing generator 164 is made enable by the output S5 and the image sensor 135 is driven. Signal S9 to enable the timing generator 164 passes through the gate 165, but since signal S6 inputted to the gate 165 is made "1" by $\overline{Q}$ output S4 of the monostable multivibrator 161, Q output S5 of the flip-flop 162 appears at S9 as it is.

Output picture element number of the image sensor 135 is counted by the counter 163, and if prescribed count (=picture element number) is finished $\overline{Q}$ output S6 of the counter 163 becomes "0". If S6 becomes "0", S9 also becomes "0" thereby the timing generator 164 is disabled and drive of the image sensor 135 is stopped.

According to the embodiment of the invention as above described in detail, ON/OFF timing of the information reading light source is controlled in synchronization with the information read timing thereby the optical information reading apparatus to perform optimum exposure with little consumption power can be realized by simple constitution. According to the invention, since the consumption power can be made little, the invention may be preferably used particularly in an optical information reading apparatus of hand scan type by battery drive.

What is claimed is:

1. A moving type image recording apparatus comprising:
    a moving amount detecting means for detecting a moving amount of the apparatus body;
    a recording means for recording an image onto a substance to be recorded;
    a memory means for storing and holding an image information to be recorded;
    an edit means for editing the information stored by said memory means; and
    a display means for displaying the image information, wherein the image information of said memory means or the image information is edited and recorded through said recording means onto the substance to by recorded based on the detecting information from said moving amount detecting means.

2. A moving type image recording apparatus as set forth in claim 1 further comprising a reading means for reading the image on an original document corresponding to a read information based on the detection information of said moving amount detecting means, wherein the image information from said reading means is stored onto said recording means.

3. A moving type image recording apparatus as set forth in claim 2, wherein said edit means has at least one edit function among enlarge/reduce, roll up/down, image shift and line end processing.

4. A moving image recording apparatus as set forth in claim 2, wherein said display means has two or more functions among display function of displaying images in whole or partial region of a reading aperture part during reading or all images already read, displaying function of display content of a part or all of stored data during recording or edit content, and display function of displaying stored image including a record portion during recording or a record portion capable of being displayed in the display unit.

5. A moving type image recording apparatus as set forth in claim 4, wherein said display means has all of the three display functions.

6. A moving type image recording apparatus as set forth in claim 1, wherein said edit means has at least one edit function among enlarge/reduce, roll up/down, image shift and line end processing.

7. A moving type image recording apparatus as set forth in claim 1, wherein said display means has two or more functions among display function of displaying images in whole or partial region of a reading aperture part during reading or all images already read, display function of displaying content of a part or all of stored data during recording or edit content, and display function of displaying stored image including a record portion during recording or a record portion capable of being displayed in the display unit.

8. A moving type image recording apparatus as set forth in claim 7, wherein said display means has all of the three display functions.

9. A moving type image recording apparatus comprising:
   a moving amount detecting means for detecting a moving amount of an apparatus body and outputting pulses, the number of which correspond to said moving amount;
   a thermal head;
   an ink ribbon disposed between said thermal head and an original to be recorded;
   means for moving said thermal ribbon according to the movement of said apparatus body; and
   control means for controlling the drive of said thermal head on the basis of pulse signals from said moving amount detecting means;
   wherein said thermal heat is driven to start printing after apparatus body is moved a prescribed distance from a first point of movement.

10. A moving type image recording apparatus as claimed in claim 9, further comprises a position detecting means for determining an image recording starting position using a predetermined portion on a previously copied portion of the original to be recorded as a reference position.

11. A moving type image recording apparatus as set forth in claim 9, wherein the record by said recording means is performed after said moving amount detecting means detects the moving of the apparatus body by a prescribed distance.

12. A moving type image recording apparatus as set forth in claim 11, wherein said moving amount detecting means is constituted by an encoder which is rotated with rotation of a guide roller to guide the moving of the apparatus body.

13. A moving type image recording apparatus as set forth in claim 9, further comprises a reading means for reading the image on an original document corresponding to a read information based on the detection information of said moving amount detecting means, and a memory means for storing an image information from said reading means,
   wherein the image information stored in said memory means is stored onto the substance to be recorded based on the information from the moving amount detecting means.

14. A moving type image recording apparatus comprising
   a moving amount detecting means for detecting a moving amount of an apparatus body and outputting pulses, the number of which correspond to said moving amount;
   illumination control means for controlling an information reading light source by supplying a pulse of a predetermined width to said light source based upon pulse signals from said moving amount detecting means; and
   control means for controlling an image sensor for reading said information wherein said information stored in said image sensor is read after said light source is turned off by said illumination control means.

15. A moving type image recording apparatus as claimed in claim 14, further comprising a guide roller for guiding the movement of the apparatus body.

16. A moving type image recording apparatus as claimed in claim 14 wherein said moving amount detecting means comprises an encoder which is driven by a rotation of a guide roller for guiding the movement of said apparatus body.

* * * * *